United States Patent
Pierson et al.

(10) Patent No.: US 11,153,026 B2
(45) Date of Patent: Oct. 19, 2021

(54) APPARATUSES, METHODS, AND SOFTWARE FOR SECURE SHORT-RANGE WIRELESS COMMUNICATION

(71) Applicant: Trustees of Dartmouth College, Hanover, NH (US)

(72) Inventors: Timothy J. Pierson, Hanover, VT (US); Ronald Peterson, Brattleboro, VT (US); David F. Kotz, Brattleboro, VT (US)

(73) Assignee: Trustees of Dartmouth College, Hanover, NH (US)

( * ) Notice: Subject to any disclaimer, the term of this patent is extended or adjusted under 35 U.S.C. 154(b) by 0 days.

(21) Appl. No.: 16/642,160

(22) PCT Filed: Sep. 6, 2018

(86) PCT No.: PCT/US2018/049736
§ 371 (c)(1),
(2) Date: Feb. 26, 2020

(87) PCT Pub. No.: WO2019/051079
PCT Pub. Date: Mar. 14, 2019

(65) Prior Publication Data
US 2020/0358550 A1    Nov. 12, 2020

Related U.S. Application Data

(60) Provisional application No. 62/554,867, filed on Sep. 6, 2017.

(51) Int. Cl.
*H04K 3/00* (2006.01)
*H04W 4/80* (2018.01)
(Continued)

(52) U.S. Cl.
CPC ............. *H04K 3/42* (2013.01); *H04B 1/1009* (2013.01); *H04K 3/43* (2013.01); *H04W 4/80* (2018.02); *H04W 12/033* (2021.01)

(58) Field of Classification Search
CPC .......... H04W 72/042; H04W 72/0453; H04W 88/08; H04W 72/04; H04W 72/1289;
(Continued)

(56) References Cited

U.S. PATENT DOCUMENTS

2005/0020244 A1 * 1/2005 Chang .................... H04L 63/02
455/410
2007/0117524 A1    5/2007 Do
(Continued)

OTHER PUBLICATIONS

International Search Report and Written Opinion dated Nov. 20, 2018, in connection with PCT/US18/49736, filed Sep. 6, 2018.

*Primary Examiner* — Kwasi Karikari
(74) *Attorney, Agent, or Firm* — Downs Rachlin Martin PLLC

(57) ABSTRACT

Apparatuses that provide for secure wireless communications between wireless devices under cover of one or more jamming signals. Each such apparatus includes at least one data antenna and at least one jamming antenna. During secure-communications operations, the apparatus transmits a data signal containing desired data via the at least one data antenna while also at least partially simultaneously transmitting a jamming signal via the at least one jamming antenna. When a target antenna of a target device is in close proximity to the data antenna and is closer to the data antenna than to the jamming antenna, the target device can successfully receive the desired data contained in the data signal because the data signal is sufficiently stronger than the jamming signal within a finite secure-communications envelope due to the Inverse Square Law of signal propagation.

(Continued)

Various related methods and machine-executable instructions are also disclosed.

25 Claims, 10 Drawing Sheets

(51) Int. Cl.
*H04B 1/10* (2006.01)
*H04W 12/033* (2021.01)

(58) Field of Classification Search
CPC .............. H04W 52/265; H04W 52/42; H04W 72/0413; H04W 72/0426; H04W 72/0446; H04W 12/1201; H04W 12/1202; H04W 4/70; H04W 64/00; H04W 64/006; H04W 72/082; H04W 72/1273; H04W 72/1284; H04W 84/20
See application file for complete search history.

(56) References Cited

U.S. PATENT DOCUMENTS

| | | | |
|---|---|---|---|
| 2009/0237321 A1* | 9/2009 | Lin | H01Q 1/246 343/893 |
| 2010/0046421 A1* | 2/2010 | Adams | H04B 7/086 370/316 |
| 2012/0214403 A1* | 8/2012 | Shany | H04K 3/43 455/1 |
| 2013/0089123 A1 | 4/2013 | Rahul et al. | |
| 2016/0268681 A1 | 9/2016 | Hoole et al. | |

* cited by examiner

APPARATUSES, METHODS, AND SOFTWARE FOR SECURE SHORT-RANGE WIRELESS COMMUNICATION

RELATED APPLICATION DATA

This application claims the benefit of priority of U.S. Provisional Patent Application Ser. No. 62/554,867, filed on Sep. 6, 2017, and titled "SECURE SHORT-RANGE INFORMATION EXCHANGE", which is incorporated by reference herein in its entirety.

FEDERALLY SPONSORED RESEARCH OR DEVELOPMENT

This invention was made with government support under CNS1329686 awarded by the National Science Foundation. The government has certain rights in the invention.

FIELD OF THE INVENTION

The present invention generally relates to the field of secure wireless communication. In particular, the present invention is directed to apparatuses, methods, and software for secure short-range wireless communication.

BACKGROUND

Analysts predict billions of everyday devices will soon become "smart" with the addition of wireless communication capabilities. If these predictions are even close to accurate, there will soon be more than four Internet of Things (IoT) devices for every person on the planet. Some of the growth in the number of connected devices is expected to come from simply adding short-range radios using wireless protocols, such as WI-FI®, BLUETOOTH®, and ZIGBEE® protocols, to devices that already have some computational capabilities but presently lack communication abilities. Another source of growth is from objects that have historically had no processing capabilities but are expected to gain both computing and connectivity abilities—devices like thermostats, toys, jewelry, kitchenware, and farm equipment, to name a few.

These devices are envisioned to share data and control information among themselves, with new devices entering and exiting a particular environment frequently. People and the devices they wear or carry may encounter dozens, possibly hundreds, of other devices each day. Many of these devices encountered will be seen for the first time. Additionally, some of the information the devices share may be privacy sensitive or have security implications.

Today, cryptography is commonly used to ensure this data is protected when it is exchanged between devices. To configure these devices for cryptography, a secret key is often manually entered on each device. Manually configuring a large number of devices for ad hoc communications is impractical in a world where each device may encounter dozens or hundreds of new devices each day. Furthermore, many of these new IoT devices will have limited or non-existent user interfaces, making this manual secret entry even more cumbersome than configuring existing devices. This situation implies that devices that have never met, nor shared a secret, but that are in physical proximity, must somehow have a way to securely communicate that requires minimal manual intervention and yet captures user intent.

SUMMARY OF THE DISCLOSURE

In one implementation, the present disclosure is directed to an apparatus for wirelessly transmitting data to a target device. The apparatus includes a first antenna; a second antenna positioned a first fixed spacing from the first antenna; a first transmitter in operative communication with the first antenna; a second transmitter in operative communication with the second antenna; at least one processor in operative communication with each of the first transmitter and the second transmitter; and a memory containing machine-executable instructions for controlling each of the first and second transmitters, wherein the machine-executable instructions include instructions for controlling the at least one processor so as to cause the first transmitter to transmit via the first antenna a data signal containing the data; and cause the second transmitter to transmit via the second antenna a jamming signal while the first transmitter is transmitting the data signal.

In another implementation, the present disclosure is directed to a method of wirelessly transmitting data to a target device having a target antenna. The method includes receiving an indication to begin a secure-communications process. In response to receiving the indication to begin the secure-communications process, transmitting a data signal containing the data via a first antenna located proximate to the target antenna, and simultaneously with the transmitting of the data to the target device, transmitting a jamming signal via a second antenna located distal from the target antenna.

In yet another implementation, the present disclosure is directed to a memory containing machine-executable instructions for performing a method of wirelessly transmitting data to a target device having a target antenna. The method includes receiving an indication to begin a secure-communications process. In response to receiving the indication to begin the secure-communications process, transmitting a data signal containing the data via a first antenna located proximate to the target antenna, and simultaneously with the transmitting of the data to the target device, transmitting a jamming signal via a second antenna located distal from the target antenna.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

1. Introduction

Figure 1:
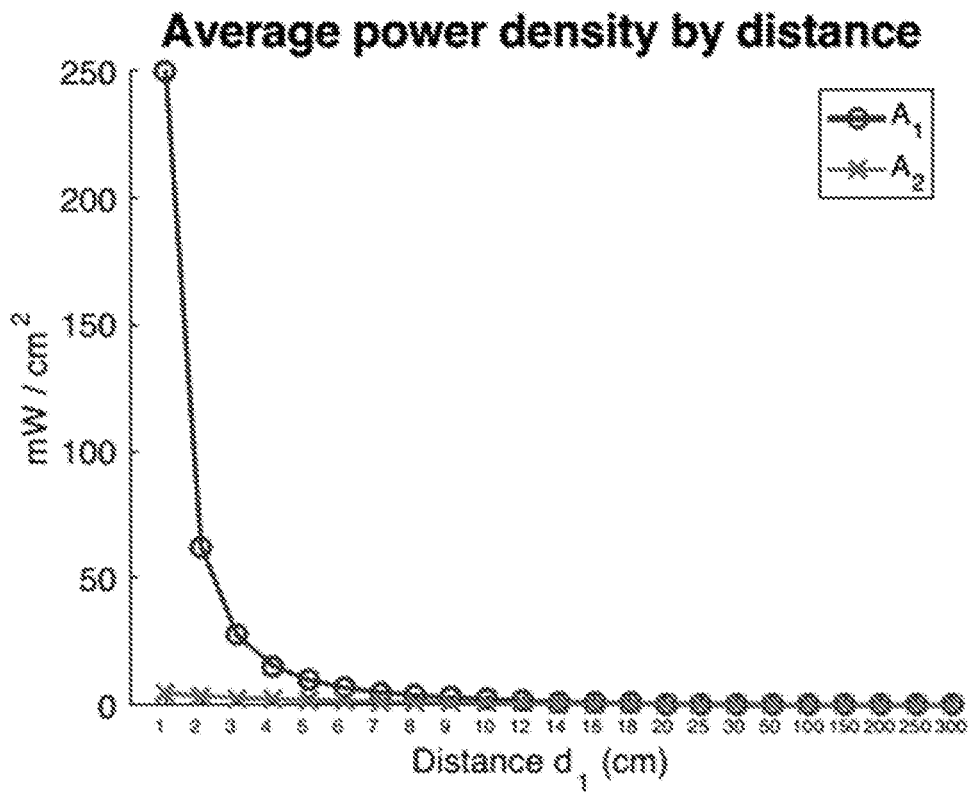
FIG. 1 is a graph of expected average power density versus distance for a receiving antenna spaced from two transmitting antennas, each sending a 24 dBm signal, with antenna $A_1$ located a distance $d_1$ cm from the receiving antenna and antenna $A_2$ located $d_2=d_1+\lambda/2$ from the receiving antenna.

In some aspects, the present disclosure is directed to various "data-jam" apparatuses that provide for secure short-range wireless communication between themselves and at least one target device. Each of these data-jam apparatuses may use radios that utilize any one or more of short-range wireless communication protocols, such as WI-FI®, BLUETOOTH®, and ZIGBEE® protocols, among others, and that may, for example, operate using any suitable standard, such as any IEEE 802.11 or IEEE 802.15 standard, among others. As will become apparent after reading this entire disclosure, each data-jam apparatus can be embodied into any one of a wide variety of devices including, but not limited to, wearable "smart" devices (e.g., smartwatches, fitness trackers, smart jewelry, wearable computers, augmented reality gear, virtual reality gear, etc.), smart appliances (e.g., kitchen and other household and commercial appliances, etc.), personal computers (e.g., laptop computers, tablet computers, and desktop computers) smartphones, wireless security devices (e.g., cameras, smart locks, etc.), smart controls (e.g., smart thermostats, smart lighting controllers, etc.), wireless routers, and data-jam device, among many other devices. As will also become apparent after reading this entire disclosure, a target device can also be any of a wide variety of devices, including, but not limited to, wearable "smart" devices (e.g., smartwatches, fitness trackers, smart jewelry, wearable computers, augmented reality gear, virtual reality gear, etc.), smart appliances (e.g., kitchen and other household and commercial appliances, etc.), personal computers (e.g., laptop computers, tablet computers, and desktop computers) smartphones, wireless security devices (e.g., cameras, smart locks, etc.), smart controls (e.g., smart thermostats, lighting controllers, etc.), and smart sensors (e.g., temperature sensors, optical sensors, motion sensors, etc.), among many other devices.

In the context of the present disclosure, the term "data-jam" refers to an important characteristic of apparatuses and devices of the present disclosure that participate in providing the secure short-range wireless communication, namely the simultaneous transmission of both at least one data signal, which contains data to be communicated to one or more target devices, and at least one jamming signal. As described below in detail, the apparatuses and methods of the present disclosure exploit the property that radio waves attenuate as they travel through a medium proportionally with the square of the distance between the transmitter and receiver.

Briefly, a data-jam apparatus of the present disclosure utilizes two or more spaced apart, but relatively close, antennas, with at least one of the antennas transmitting a data signal and at least one other of the antennas simultaneously transmitting a jamming signal. By placing a target device, or more precisely, a receiving antenna aboard the target device, in close proximity to the data-signal-transmitting antenna but distally from the jamming-signal-transmitting antenna, the receiving device can retrieve the data despite the presence of the jamming signal, because the data signal carrying the data is multiple-times stronger than the jamming signal. In contrast, for wireless devices located more distally from the multiple antennas, both the data and jamming signals have roughly the same power, making recovery of the data from the noise-laden combined signal extremely difficult. In this connection, it is noted that the term "secure" when used in connection with the type of communication afforded by data-jam apparatuses of the present disclosure does not need to be absolute security but rather an enhanced level of security over "normal" unjammed communications links. That said, data-jam apparatuses made in accordance with the present disclosure enable quite secure communication relative to both 1) wireless devices that may be located more distally from a data-jam apparatus than a target device and 2) eavesdroppers using directional antennas directed toward the multiple antennas of the data-jam apparatus. Details of the operating principles of secure data-jam communications are described below.

As noted above, in many instances a data-jam apparatus and a target device can be embodied in the same type of device. For example, a smartwatch can be a data-jam apparatus or it can be a target device, or it can be both. However, to be a data-jam apparatus, it needs at least two antennas, at least one for transmitting a data signal and at least one other for simultaneously transmitting a jamming signal. In addition, the antennas transmitting those two types of signals must be spaced apart by at least a minimum distance. With some devices, adding a second antenna and a second transmitter may not be economical, and with some devices, physical constraints will not allow multiple antennas to be spaced far enough apart for the data-jam operating principles to work effectively. In such cases, the devices can be only target devices. Otherwise, most any wireless device can be made to function as a data-jam apparatus. Importantly, it is noted that a target device need not ever have communicated with the data-jam device at issue, though in some embodiments it could have. Indeed, the target device does not even have to know that a data-jam apparatus is even transmitting a jamming signal. Because of the greater strength of the data signal, it simply receives the data in the presence of the lower-power noise from the jamming signal.

In some aspects, the present disclosure is also directed to methods and software for effecting secure communications using data-jam operating principles disclosed herein. Such methods include methods of controlling data-jam functionality of a data-jam apparatus. Data-jam apparatuses can implement these methods using machine-executable instructions that perform these methods. Other methods include methods of effecting secure close-range communication and methods of directing a user to permit secure close-range communication. These methods can be fully or partially implemented using machine-executable instructions executed by a target device or a data-jam apparatus or both. Details regarding these and other methods are described below.

A data-jam apparatus may be used, for example, to transfer confidential (e.g., non-cryptographic data) or secret data (e.g., cryptographic data such as a cryptographic key) under cover of signal jamming when the data-jam apparatus and a target device are in close proximity with one another. Example uses of a data-jam apparatus made in accordance with the present disclosure abound. Such uses include transferring confidential data, such as medical data, from a smart health-monitoring device to a target device, such as a secure computer. If the smart health-monitoring device functions as the data-jam apparatus, it can send the confidential data to the target device under jamming cover. In this case, the smart health-monitoring device need not establish an otherwise secure connection, such as a cryptographic connection, and the smart health-monitoring device need not ever had communicated with one another. On the other hand, if the smart health-monitoring device is the target device and does not have data-jam capabilities, the other device, e.g., a secure computer, acts as the data-jam apparatus and the smart health-monitoring device will receive the confidential data. In this case, the data-jam apparatus may securely transmit a secret key or other data for establishing a secure two-way communications link between the data-jam apparatus and the smart health-monitoring device. Once that secure two-way communications link has been established, the smart health-monitoring device can securely transmit the confidential data to the data-jam apparatus.

The preceding health-data-transfer examples are merely two basic examples of how secure data-jam communications of the present disclosure can be used. There are many situations where secure data transfer or exchange is desirable. Uses that may become ubiquitous are the initial pairing of devices that have never communicated with one another before a data-jam interaction and the adding of a new device to a secure network. These uses are desirable because the data-jam functionality can be used to permit automatic paring and automatic adding, thereby eliminating the need for user interaction other than bringing the data-jam apparatus and target device into close proximity with one another to effect the secure data-jam communication. In this connection, it is recognized that in many cases both of the data-jam apparatus and target device are not practically portable or are not configured to be moved into sufficiently close proximity to one another. As a simple, non-limiting example, a smart refrigerator and a WI-FI® router typically cannot readily be moved in close proximity with one another. In such a case, an intermediary device, such as a mobile data-jam wand (see below) or other mobile data-jam apparatus, can be used to effect the adding of the smart refrigerator to the WI-FI® router's secure network. For example, a user could place the data-jam antennas of the mobile data-jam apparatus close to the antenna(s) of the smart refrigerator and orient the data-jam antennas properly so as to effect the secure transfer of the data needed to connect the smart refrigerator to the secure network. This is but one of many pairing or adding scenarios wherein a data-jam apparatus of the present disclosure is useful.

Depending on the device enabled to provide data-jam functionality of the present disclosure, no hardware modification may be needed. As long as the device has at least two sufficiently spaced-apart antennas (as is necessary on wireless devices employing beamforming technology) and can simultaneously transmit a data signal and a jamming signal via the multiple antennas, the only change typically needed is to the software or firmware, i.e., the set of machine-executable instructions, that controls the transmitters of the device. An example of a device that typically does not need any hardware modification is a commercial off-the-shelf (COTS) WI-FI® router utilizing multiple-input multiple-output (MIMO) technology.

On the other hand, if it is desired to add data-jam functionality to a wireless device that traditionally does not include multiple antennas and transmitters or the multiple antennas are not sufficiently spaced, hardware modifications will be necessary. For example, a single antenna/single transmitter smartwatch could be (re)designed to include two antennas and two corresponding transmitters. To obtain the needed antenna spacing, for example, one antenna could be placed in the case of the smartwatch and the other antenna could be placed in the wristband in the clasp region. Other locations could be used in the alternative. Devices having only a single antenna, however, can still be target devices.

2. Operating Principles

The approach of the present disclosure to overcoming jamming for devices in close physical proximity to one another relies on the fact that radio waves attenuate proportionally with the distance the signal travels. The insight for the data-jam methodology is that when the transmitter and receiver are in close physical proximity, the data signal from the nearby data-transmitting antenna can be sufficiently stronger than the jamming signal from the farther jamming antenna such that the receiver can recover the data signal, while a more distant adversary cannot. When a receiving antenna is extremely close to the transmitting antenna, the receiving antenna is said to be in the "near field" of the transmitting antenna. At longer range, the receiver is said to be in the "far field" (also called the "Fraunhofer region").

The boundary between the near and far field for a finite-length transmitting dipole antenna is estimated at distance d from the antenna as follows:

$$d = \frac{2D^2}{\lambda} \tag{1}$$

wherein D is the length of the transmitting antenna plus the length of the receiving antenna, and $\lambda$ is the signal wavelength. As an example, Equation (1) projects that the far field for quarter-wavelength antennas at the 2.4 GHz band of a WI-FI® device begins at roughly 6.2 cm and is as short as 3.1 cm for the 5 GHz band. (Some sources suggest the far field for short antennas (where $D \ll \lambda$) are best approximated by $d = \pi/2\lambda$, which yields distances of 1.9 cm and 0.8 cm for the 2.4 and 5 GHz bands respectively.) The boundary is not sharp, but instead transitions gradually between the near and far fields.

In the far field, radio waves attenuate proportionally to the square of the distance between the transmitter and receiver. This signal propagation relationship is captured in the far field by the well-known Friis transmission model:

$$P_r = P_t G_t G_r \left(\frac{\lambda}{4\pi d}\right)^2 \quad (2)$$

wherein $P_r$ is the power at the receiving antenna in milliwatts, $P_t$ is the power transmitted, $G_t$ is the gain of the transmitting antenna, $G_r$ is the gain of the receiving antenna, $\lambda$ is the wavelength of the signal, and d is the distance between the transmitting and receiving antennas. From Equation (2) it is clear that if the distance, d, between transmitter and receiver is reduced by one-half, then the received power is increased by a factor of four.

Equation (1) provides an estimate for the boundary between the near and far field, but in reality the boundary is not sharply defined. Instead, the electric E and magnetic H fields generated by a transmitting antenna begin to align more fully so that they are orthogonal (perpendicular) to each other, transverse to the radial direction of propagation, as the signal moves substantially into the far field.

Because the boundary is not sharp and the data-jam protocol is designed for communications between devices separated by approximately the estimated distance from Equation (1), Equation (2) cannot be simply used to estimate signal strength at the receiver, because Equation (2) is only valid in the far field.

Known approximations for the E and H fields show that they are valid everywhere, except on the surface of the antenna, for a thin-wire (radius r<<l) finite-length dipole:

$$E \simeq j\eta \frac{I_0 e^{-jkd}}{2\pi d}\left[\frac{\cos\left(\frac{kl}{2}\cos\theta\right) - \cos\left(\frac{kl}{2}\right)}{\sin\theta}\right] \quad (3)$$

$$H \simeq j\frac{I_0 e^{-jkd}}{2\pi d}\left[\frac{\cos\left(\frac{kl}{2}\cos\theta\right) - \cos\left(\frac{kl}{2}\right)}{\sin\theta}\right] \quad (4)$$

wherein $j=\sqrt{-1}$, $\eta=120\pi$ is the intrinsic impedance of free space, $I_0$ is the current applied to the transmitter, $k=2\pi/\lambda$ is the wavenumber, d is the distance from the transmitting antenna, and $\theta$ is the vertical angle between the transmitter and receiver (below we assume $\theta=\pi/4$ indicating the two antennas are vertically aligned).

Given Equations (3) and (4), we can estimate the average power density:

$$W_{av} = \frac{1}{2}\mathfrak{R}[E \times H^*] \quad (5)$$

wherein $\mathfrak{R}$ is the real component of these complex numbers and * is the complex conjugate.

Equation (5) suggests that power density drops with the square of distance. If the distance d between transmitting antenna and receiving antenna is reduced by one-half, then the average received power is increased by a factor of four. This relationship between distance and power is often referred to as the "Inverse Square Law."

The relationship is particularly stark when a receiver is in close proximity to a transmitter. FIG. 1 shows the expected average power density according to Equation (5), wherein transmitting antennas $A_1$ and $A_2$ (FIG. 2) are separated by a fixed distance of one-half wavelength ($\lambda/2$), and a receiver is located a distance $d_1$ cm away from $A_1$, such that $d_2=d_1+\lambda/2$. Antenna $A_1$ transmits a data signal while antenna $A_2$ transmits a jamming signal, such as a barrage-type jamming signal or a tone-type jamming signal. In this example, each antenna $A_1$ and $A_2$ transmits at equal magnitude. It is noted that the data in FIG. 1 is based on a model of a 24 dBm signal transmitted using a WI-FI® protocol on channel 1's center frequency of 2.412 GHz, which has wavelength $\lambda\approx12.5$ cm. It is also noted that in this example, the spacing between antennas $A_1$ and $A_2$ was $\lambda/2$. Other spacings can be used, though a spacing of $\lambda/2$ is useful in inhibiting eavesdropping using a directional antenna. The data depicted in FIG. 1 is simply an example.

It is seen in FIG. 1 that when a receiving antenna is very close to a transmitting antenna, it receives a significantly stronger signal than a signal from a transmitting antenna located only one-half wavelength farther away. In this case, when antenna $A_1$ (FIG. 2) is located at $d_1=1$ cm, then $d_2\approx7.25$ cm, that is, 7.25 times farther than $d_1$. Because the power received is relative to the square of distance, even though both transmitting antennas are physically close to the receiving antenna, the signal from antenna $A_1$ is roughly 50 times stronger than the signal from antenna $A_2$. The difference in power between a signal sent from antennas $A_1$ and $A_2$ drops quickly as distance from the transmitting antennas increases. When antenna $A_1$ is more than about 7 cm away from the receiving, or target, antenna, the received signal strength from each transmitting antenna is virtually identical. A distant device, therefore, receives roughly equal-strength signals from both antennas.

When wireless devices are in close proximity to one another they enjoy a unique channel advantage over wireless devices located farther away. That channel superiority vanishes quickly as devices move apart. Data-jam apparatuses of the present disclosure use this channel advantage between nearby devices to provide secure communications while denying a more distant adversary the ability to recover the data.

3. Signal Errors

The performance of wireless digital communication systems carrying data in the presence of noise (both natural and intentional) has been well studied and has produced analytical models that predict the number of communication errors expected to occur given three factors: 1) data signal strength, 2) noise intensity, and 3) modulation scheme. Those models are used to calculate the theoretical error rates given the physical arrangement of transmitting antennas and receiving antennas described in Section 2, above, in which example an antenna of a target device is located near a data antenna $A_1$ and one-half wavelength farther from jamming antenna $A_2$. Section 5, below, presents results from experiments using real, COTS WI-FI® protocol devices to illustrate real-world usefulness of data-jam methodologies disclosed herein.

3.1 Data Signal Strength and Noise Intensity (WI-FI® Example)

The relationship between a signal and noise is captured by the Signal-to-Noise Ratio (SNR):

$$SNR = \frac{P_r}{N_0 B} = \frac{E_s}{N_0 B T_s} = \frac{E_b}{N_0 B T_b} \quad (6)$$

wherein $P_r$ is the received power of the data signal, $N_0$ is the power spectral density of the noise, B is the bandwidth, $E_s$ is the energy per symbol, $E_b$ is the energy per bit, $T_s$ is the symbol time, and $T_b$ is the bit time. For pulse-shaping systems such as a WI-FI® based system wherein $T_s=N/B$, Equation (6) simplifies to SNR=$E_s/(N_0N)$ where N is the number of samples per symbol.

In the presence of barrage noise jamming, where the jammer interferes across the entire signal bandwidth (as opposed to tone jamming where noise is only transmitted on specific frequencies), the total power spectral density of the noise becomes:

$$N_t = N_0 + N_j \quad (7)$$

wherein $N_t$ is the total noise power spectral density, $N_0$ is the power spectral density of any background noise, and $N_j$ is the power spectral density of the barrage jamming. Accounting for noise provides the Signal-to-Interference-plus-Noise Ratio (SINR) where:

$$\text{SINR} = \frac{P}{(N_0 + N_j)B} = \frac{P_r}{N_t B} \quad (8)$$

Equation (8) can be used to provide the SINR per symbol, $\gamma_s$:

$$\gamma_s = \frac{P_r T_s}{N_t B T_s} = \frac{E_s}{N_t B T_s} = \frac{E_s}{N_t N} \quad (9)$$

3.2 Example Modulation Schemes (WI-FI® Example)

Figure 2:
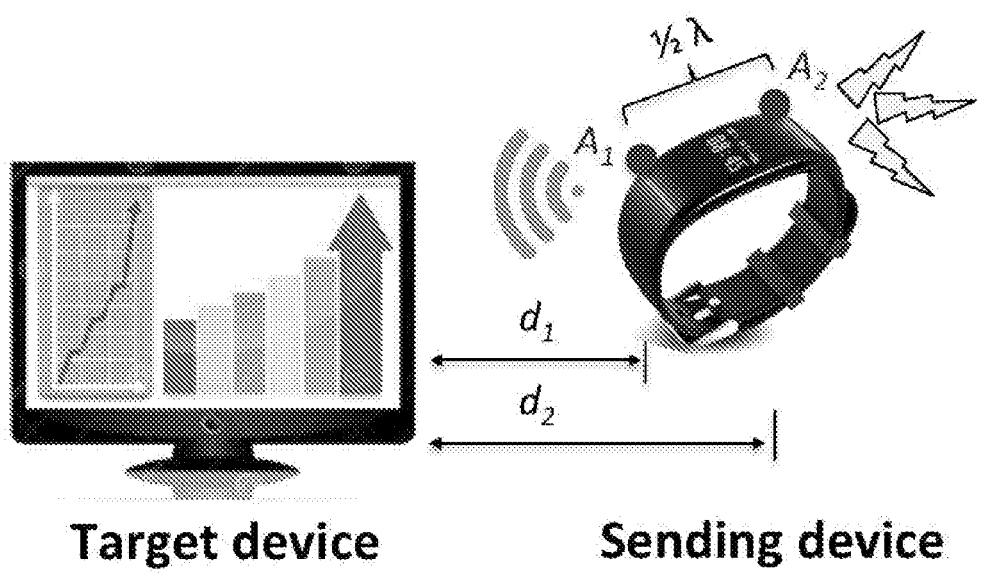
FIG. 2 is a diagram of an example data-jam device and an example target device, illustrating an example geometry of interaction between the data-jam and target devices.
Figure 3:
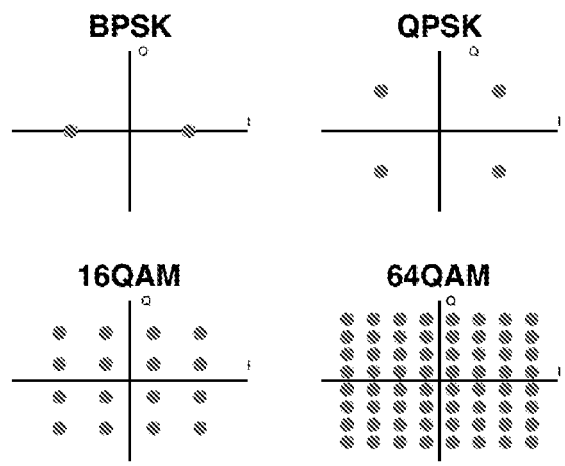
FIG. 3 is a constellation diagram, with the dots representing symbols in the complex plane.

IEEE 802.11a/g/n/ac uses Orthogonal Frequency Division Multiplexing (OFDM) to send data symbols over several different subcarriers simultaneously, resulting in higher data rates than serial single-channel communications. Speed can be further enhanced with the type of modulation used on each subcarrier. In the WI-FI® modulation, the simplest modulation type is Binary Phase Shift Keying (BPSK), wherein each symbol represents one bit. More complex than BPSK, Quadrature Phase Shift Keying (QPSK) symbols represent two bits of information. In addition, Quadrature Amplitude Modulation (MQAM) is the most complex WI-FI® modulation type where each symbol represents $\log_2(M)$ bits and M is 16, 64, or 256 (and possibly more in the future). More complex modulation schemes increase the data rate because each symbol represents more bits. FIG. 2 shows these modulation types in a constellation diagram where a symbol, representing one or more bits, is shown as a dot in the complex plane.

To send a symbol, a transmitter selects the complex number on the constellation diagram representing the desired bit pattern, then modulates a cosine wave on a carrier frequency with the real component of the complex number, and also modulates a sine wave on the same carrier frequency with the imaginary component of the complex number. In this way the transmitter can send both the real and imaginary component of the complex number simultaneously on a single radio frequency. Assuming an Additive White Gaussian Noise (AWGN) channel, a receiver receives the signal as:

$$y[t] = x[t] + n[t] \quad (10)$$

wherein y[t] is the received signal, x[t] is the transmitted signal, and n[t] is the noise on the channel at time t.

The receiver then determines the nearest symbol to y[t] on the complex plane. Because y[t] includes noise, it may not fall exactly on a symbol, so the receiver chooses the closest symbol and infers that symbol is what the transmitter sent. Using a more complex modulation increases the susceptibility to noise because there are more possible symbols and smaller amounts of noise can cause the receiver to misinterpret a symbol corrupted by noise.

To compensate for noise, the WI-FI® protocol uses convolutional coding to create redundancy by adding duplicate bits to each transmission. For example, 1/2 coding means that each bit is duplicated, resulting in 2 bits for every input bit. Coding redundancy reduces the overall data rate (e.g., 1/2 coding reduces the data rate by half), but can improve throughput by increasing reliability, especially in noisy environments.

A modulation type combined with a coding scheme is known as a Modulation Coding Scheme (MCS). IEEE 802.11g can use one of eight different schemes: BPSK 1/2, BPSK 3/4, QPSK 1/2, QPSK 3/4, 16QAM 1/2, 16QAM 3/4, 64QAM 2/3, and 64QAM 3/4. 802.11n and 802.11ac can use these modulation schemes as well, but can also use more complex modulation schemes. In Section 5 below, however, experiments have shown that more complex schemes may not survive the jamming from antenna $A_2$, so the current focus in this example is on the foregoing eight modulation coding schemes.

3.3 Energy Per Bit

The chosen MCS influences the energy per bit because a symbol may represent many bits, and each bit may be duplicated. Taking the energy per symbol from Equation (9) as a constant, the bit redundancy yields the SINR per bit, $\gamma_b$:

$$\gamma_b \approx \frac{\gamma_s}{R_c \log_2 M} \quad (11)$$

wherein $\log_2 M$ is the number of bits per symbol and $R_c$ is the coding rate (e.g., 1/2). There is a trade-off in Equation (11): as the number of bits per symbol increases, the energy per data bit decreases, but as the coding scheme produces more redundant bits, the energy per data bit increases.

3.4 Estimating Errors

Assuming an AWGN channel between sender and receiver, that all symbols in a modulation scheme are equally likely to be transmitted, and that Gray coding is used, so that one symbol error corresponds to one bit error (a conservative estimate, especially for complex modulation schemes), the probability of a symbol error, Ps, can be calculated. Others have given an excellent derivation of the error estimate equations shown in Table 1 where the Q function is $$Q(x) = \frac{1}{\sqrt{2\pi}} \int_\lambda^\infty e^{-\frac{x^2}{2}} dx \quad (12)$$

| Modulation | M | $P_s$ |
|---|---|---|
| BPSK | 2 | $Q(\sqrt{2\gamma_b})$ |
| QPSK | 4 | $2Q(\sqrt{\gamma_b}) - Q^2(\sqrt{\gamma_b})$ |
| 16QAM | 16 | $4Q\left(\sqrt{\frac{4\gamma_b}{5}}\right)$ |

-continued

| Modulation | M | $P_s$ |
|---|---|---|
| 64QAM | 64 | $4Q\left(\sqrt{\dfrac{3\gamma_b}{7}}\right)$ |

The Table immediately above indicates the probability of a symbol error depends on the signal's power relative to noise and the modulation type chosen. Assuming Gray coding, the probability of a bit error, $P_b$, can also be estimated as $$P_b \approx \frac{P_s}{\log_2 M} \quad (13)$$

In the next section, these estimates are used to predict the ability of a WI-FI® device to successfully transmit data to nearby devices while denying more distant devices.

4. Theoretical Performance (WI-FI® Example)

Section 3, above, provided a mathematical underpinning to estimate theoretical performance of a data-jam system of the present disclosure. In this section, those equations are used to model expected performance of a data-jam system of the present disclosure, and in Section 5, below, results of experiments using COTS WI-FI® devices are described. For all experiments and theoretical estimates the antennas $A_1$ and $A_2$ were separated by one-half wavelength, with $d_2 = d_1 + \lambda/2$, and arbitrarily choose the WI-FI® devices' channel 1. Jamming phase and amplitude were modeled using a normal Gaussian distribution with zero mean and unit standard deviation, $X \sim \mathcal{N}(\mu=0, \sigma^2=1)$.

The Table above shows that the key to estimating errors, regardless of modulation scheme, is the ratio between the energy per bit and the energy in the noise. For the data-jam communications scheme of the present disclosure, that ratio is primarily driven by two factors: 1) the geometry between the target device and the sending device's antennas, and 2) the ratio of transmit power of the two antennas (there is of course other noise in the environment; here it was modeled at −92 dBm, but it typically has little impact on the error estimates).

4.1 Geometry

Figure 4:
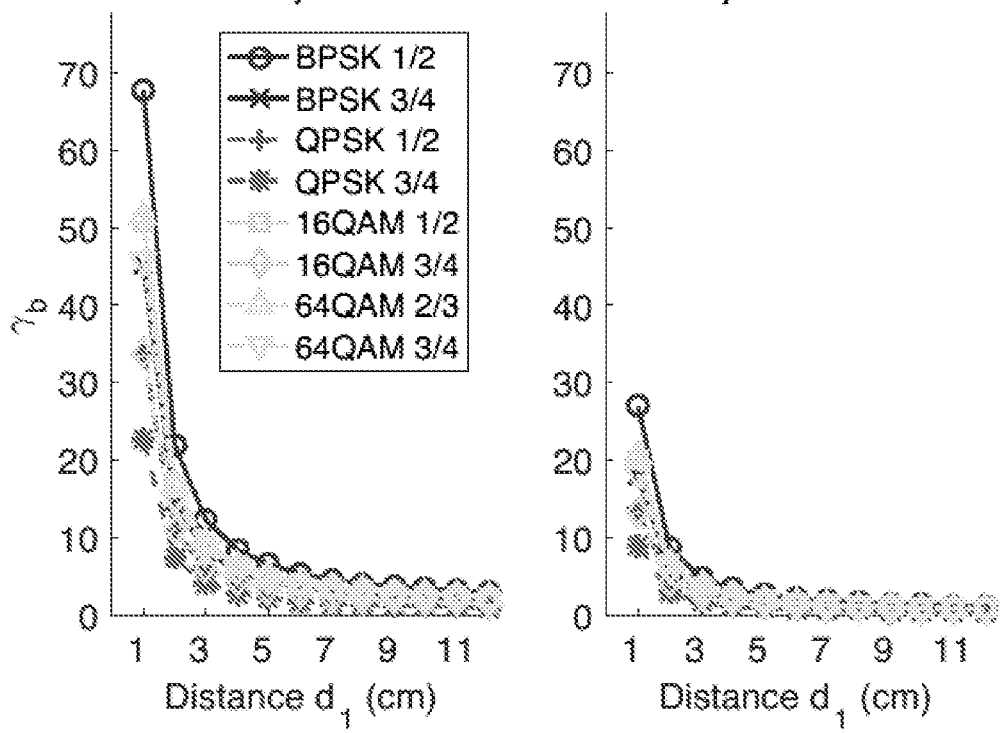
FIG. 4 contains a pair of graphs of energy per bit versus noise at close range for a modeled data-jam apparatus for jamming power being equal to the data-transmission power (left-hand graph) and for jamming power being 2.5 times greater (4 dBm) than the data-transmission power (right-hand graph)

Geometry drives the ratio between signal and noise, as shown in FIG. 4. The received power of the data signal, $P_r$, was estimated using Equation (5) at distance $d_1$. The noise power was estimated similarly, but using the transmit power $P_j$ from jamming antenna $A_2$ at distance $d_2$. Assuming that antenna $A_1$ transmits data at the same strength that antenna $A_2$ transmits jamming, due to redundancy in some modulation coding schemes, when the target device is located near antenna $A_1$, the energy per bit will be up to 70 times stronger than the jamming signal. That ratio is maximized when the antenna of the target device is located where $d_1$ is small and the antennas $A_1$ and $A_2$ are aligned so that $d_2 = d_1 + \lambda/2$.

In some embodiments, one or both of a target device and a data-jam apparatus of the present disclosure can be adorned with an indicator, such as an arrow, light(s), graphical display, haptic device, and/or aural device, to reveal how to align the devices. If the antenna of the target device is not well aligned relative to the transmit antennas, the ratio of signal strength to jamming will be reduced, resulting in increased noise relative to the signal. This works to the advantage of a data-jam system of the present disclosure, because legitimate receivers can be placed near the transmit antennas and easily aligned to maximize $d_2$, leveraging the Inverse-Square Law, whereas more distant or less geometrically aligned devices will see a lower $\gamma_b$, as shown in FIG. 4 in the left-hand graph

4.2 Jamming Transmit Power

Another factor that can affect the ratio of energy per symbol to noise is the transmit power of the data and jamming signals. The jamming transmit power was modeled as $P_1 = P_t + \delta$ dBm, where $\delta \in \{0, 4\}$. In the first case the data and noise signal transmit power are equal; in the second case the jamming power is 4 dBm (2.5 times) higher than the data signal. In this latter case, shown in FIG. 4 in the right-hand graph, the data-jam system relies even more heavily on the geometry and Inverse-Square Law to ensure the receiver is able to recover the data signal in the presence of more noise. If the antenna of a legitimate target device is placed near the data antenna, the received data signal can still be almost 30 times stronger than the jamming signal.

Figure 5:
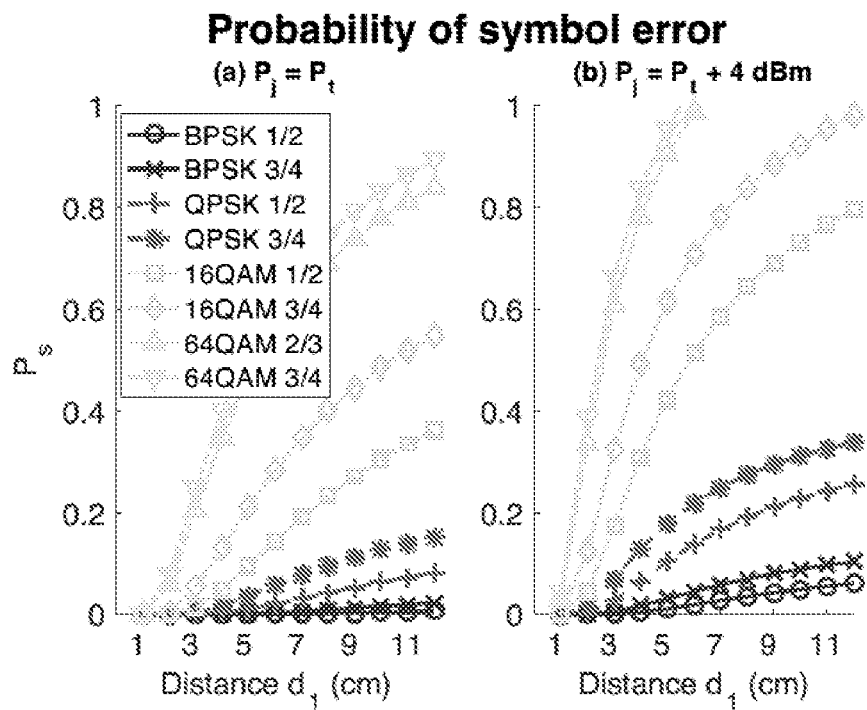
FIG. 5 contains a pair of graphs of the probability of symbol error for a modeled data-jam apparatus for jamming power being equal to the data-transmission power (left-hand graph) and for jamming power being 2.5 times greater (4 dBm) than the data-transmission power (right-hand graph)

FIG. 5 plots the theoretical probability of a symbol error, $P_s$, calculated using the equations in the Table above, and the energy per bit to noise, $\gamma_b$, when a tested data-jam device used each of the eight modulation schemes and the target is aligned with the transmit antennas were plotted. From those plots it was seen that symbols transmitted with the simpler modulation types of BPSK and QPSK are more likely to be received without error than the more complex MQAM modulation schemes.

The WI-FI® protocol groups bits into frames for transmission. If a frame contains b bits, then the probability a frame is received without error, $P_f$, is:

$$P_f = (1 - P_a)^{b/\log 2M} \quad (14)$$

Figure 6:
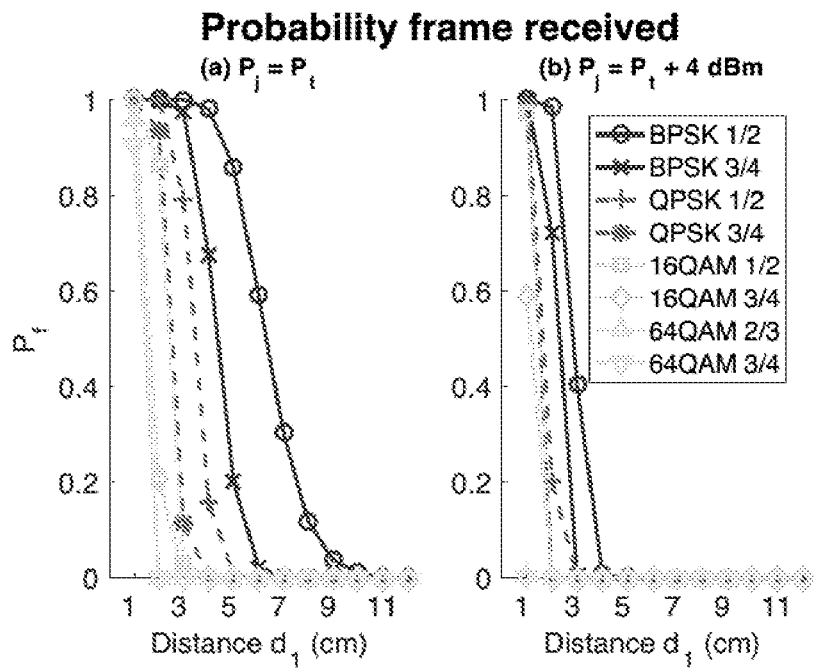
FIG. 6 contains a pair of graphs of probability a frame is received without error, given a 1,024-bit frame, for a modeled data-jam apparatus for jamming power being equal to the data-transmission power (left-hand graph) and for jamming power being 2.5 times greater (4 dBm) than the data-transmission power (right-hand graph)

FIG. 6 shows a plot of probability, $P_f$, assuming the frame contains a modest payload of b=1,024 bits. Frames are likely to be received without error for BPSK and QPSK when the target is close (less than about 5 cm), and the probability of receiving a frame without error becomes extremely low at greater distances.

These estimates suggest that BPSK can be a good candidate to securely and reliably transfer data to a device in close physical proximity in the presence of jamming, while denying a more distant eavesdropper. This distance limitation may also help mitigate innocent errors where data is unintentionally transferred to a device located farther away from the multiple-antenna device.

4.3 Data Transmit Power

Another possible approach to securely transferring data between two nearby devices would be to lower the data transmit power and hope that a more distant eavesdropper would not be able to receive the weak signal. Reducing a typical WI-FI® device's transmit power of approximately 24 dBm to 4 dBm would reduce the transmit power by a factor of 100. Intuitively, that approach appears to be an easy way to reduce an adversary's range by a factor of 100. Because the signal attenuates with the square of distance, however, that is not the case. If the minimum signal strength at which a device can receive a signal, $P_r$, is known, and assuming the device is in the far field, the maximum distance where a transmitted signal is recoverable can be derived by rewriting Equation (2) as:

$$d = \frac{\lambda}{4\pi\sqrt{\dfrac{P_r}{P_t G_t G_r}}} \quad (15)$$

wherein $P_t$ is the transmit power, $G_t$ and $G_r$ are the gain of the transmitter and receiver respectively.

For example, if a system is able to recover a signal at $P_r=-73$ dBm, and no obstacles attenuate a 24 dBm signal, then by Equation (15), the received power will reach the device's minimum after the signal travels approximately 700 m. Dropping the transmit power to 4 dBm, however, yields a distance of roughly 70 m, only 10 times less than when transmitted at high power, not the 100 times reduction in range that one might have expected.

These calculations suggest that to avoid detection by an adversary located less than 1 m away, the transmit power will need to be reduced to an extremely low level. In theory, reducing the transmit power to −50 dBm would result in a −73 dBm received signal at 20 cm. While these calculations suggest the possibility that extremely low power could be helpful, there are two important considerations. First, an adversary can use a high-gain directional antenna to boost his receive range. A 9 dBi antenna would increase $G_r$, making the adversary's effective range roughly one-half meter. Second, environmental noise is likely to create significant issues for the legitimate target device at these levels.

Even though reducing transmit power alone does not provide assurance that a signal will not be recovered by a distant device, lowering transmit power still makes an eavesdropping adversary's task more difficult. In the next section an experiment with commercial-off-the-shelf WI-FT® devices and 4 dBm data transmit power are described as an example.

5. Example Experimentation (WI-FI® Example)

To test the effectiveness of COTS Wi-Fi devices to receive a signal in the presence of jamming, four devices with electronics similar to those found in embedded devices were tested: a Panda Ultra Wireless N USB Adapter, an Edimax EW-7811Un, an external Alfa Networks AWUS036H, and an internal Intel Ultimate N WiFi Link 5300 connected to a Planar Inverted-F antenna.

On the transmit side, two calibrated Ettus Research N210 Universal Software Radio Peripheral (USRP) radios were used, each connected to a quarter-wavelength dipole antenna to simulate a multiple-antenna device. One USRP transmitted data using the GNU Radio 802.11a/g/p transceiver code developed by others, while the second USRP transmitted barrage jamming across the WI-FI® based 20 MHz channel during frame transmission. This arrangement allowed precise control of the signal strength and coordination of the timing of both the data and the jamming signals. The antennas were separated by one-half wavelength in keeping with the example discussed above. All experiments were conducted on WI-FI® channel 1 and used 4 dBm to transmit power for data, and either 4 dBm or 8 dBm transmit power for jamming.

The ability of the four COTS devices to receive frames containing a 1,024-bit payload sent from the USRP was first tested without the presence of jamming. In this test, 1,000 WI-FI® frames were transmitted for each of the eight modulation schemes discussed in the previous section above, with an interval of 100 ms between frames. To minimize outside interference, these receivers were tested in a remote indoor facility where there were no other WI-FI® transmitters within at least 100 yards. The commercial devices were found to performed similarly; and for brevity, the average results across all four devices are presented herein.

Figure 7:
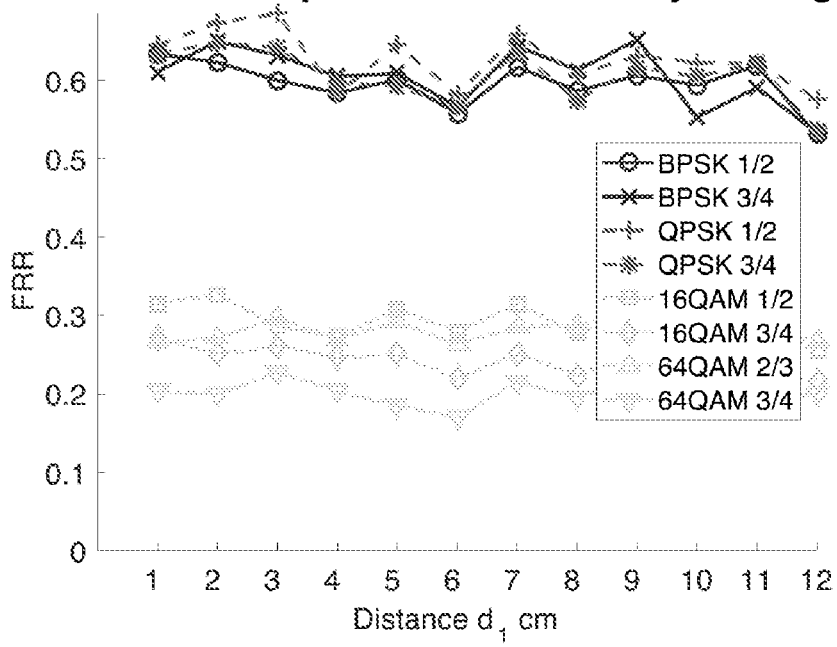
FIG. 7 is a graph of frame reception ratio for 1,000 packets sent on each MCS for an instantiation of data-jam apparatus.

FIG. 7 shows the average Frame Reception Ratio (FRR)—the number of frames received by the WI-FI® device, divided by the number of frames transmitted, for all four receivers where $d_1$ ranged from 1 to 12 cm. As shown in FIG. 7, the simpler modulation schemes were received with significantly higher probability than the more complex modulation schemes. Unsurprisingly, while theory suggests frame reception should have been near 100 percent when the devices are in such close proximity, real-life performance was well below predicted.

Figure 8:
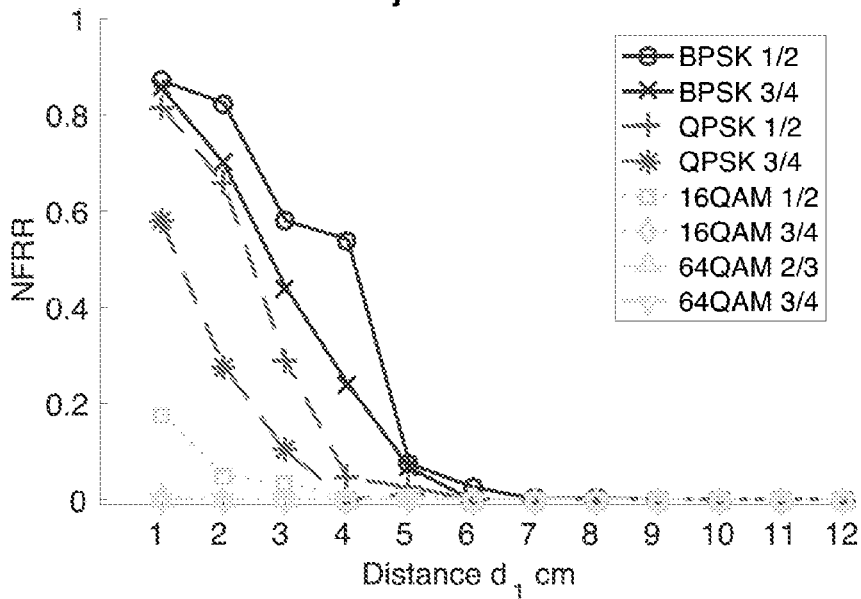
FIG. 8 is a graph of normalized frame reception ratio for 1,000 packets sent on each MCS when $P_j=4$ dBm.

Next, the ability of the WI-FI® devices to receive frames in the presence of jamming was tested. FIG. 8 shows the average FRR across all four devices when jamming signal strength was equal to the data signal strength (i.e., $P_j=P_t$), normalized to the FRR when no jamming was present (we refer to this ratio as NFRR). As shown in FIG. 8, BPSK 1/2, BPSK 3/4, and QPSK 1/2 performed relatively well when $d_1$ was less than 5 cm. More complex modulation schemes were received with low probability at close range, and all modulation schemes performed poorly at longer ranges. This is by design, as a purpose of a data-jam system of the present disclosure is to transfer data to nearby devices, but not allow reception by more distant devices.

Figure 9:
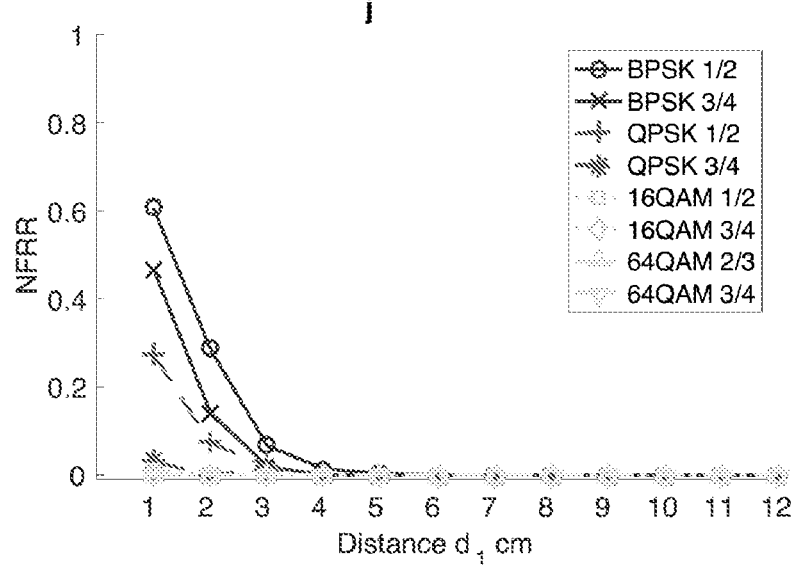
FIG. 9 is a graph of normalized frame reception ratio for 1,000 packets sent with BPSK 1/2 when $P_j=8$ dBm.

We then tested a data-jam apparatuses ability to transfer data to nearby devices when the jamming signal was 2.5 times stronger than the data signal (i.e., $P_j=P_t+4$ dBm). FIG. 9 shows the results when $d_1$ ranged from 1 to 12 cm. It was seen that BPSK has some ability to transfer data in this environment up to 3 cm, but all other schemes and distances had virtually no reception. In all cases after 6 cm, no frames were received using any modulation scheme.

Figure 10:
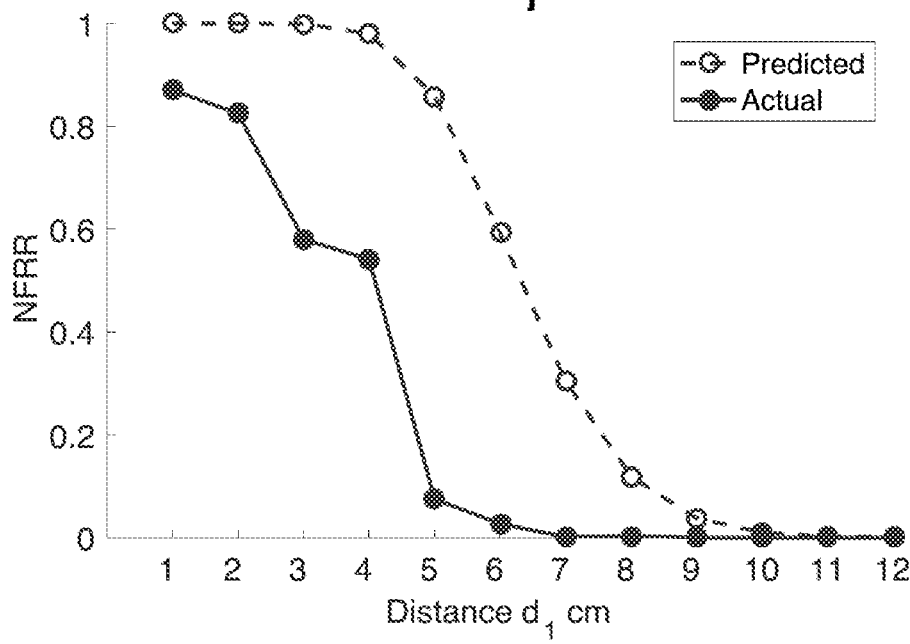
FIG. 10 is a graph of normalized frame reception ratio for 1,000 packets sent on each MCS when $P_j=4$ dBm.
Figure 11:
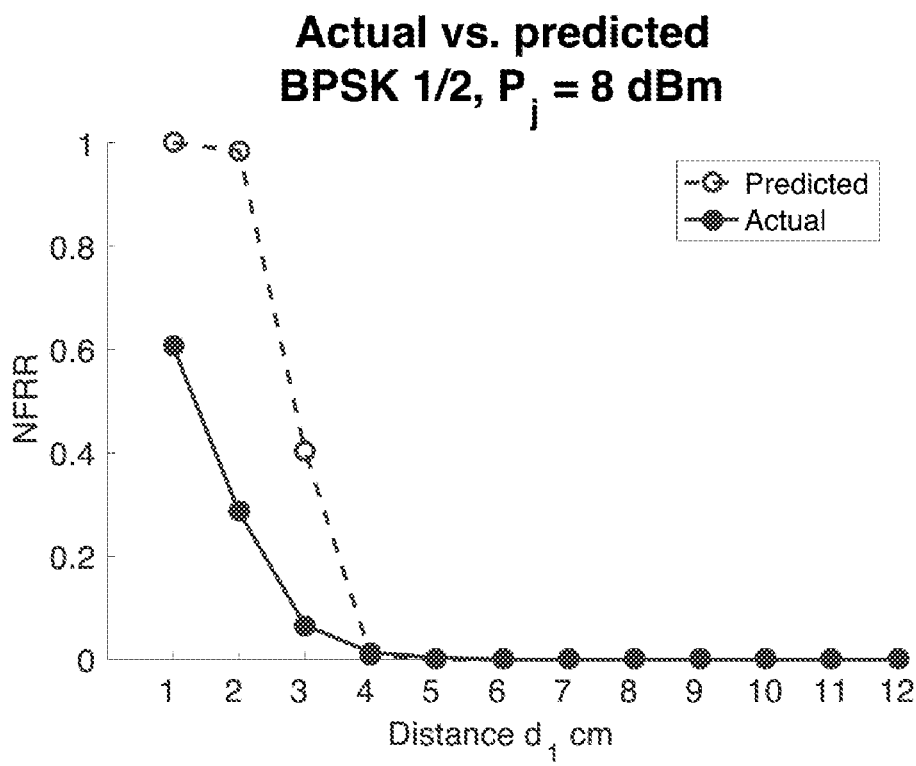
FIG. 11 is a graph of normalized frame reception ratio for 1,000 packets sent on each MCS when $P_j=8$ dBm.

Unsurprisingly, it was seen that BPSK 1/2 performs much better in the presence of noise than other modulation schemes. In FIG. 10 the BPSK 1/2 performance was compared with the theoretical performance discussed in Section 4, above, and shown in FIG. 6. It was seen that actual performance follows the theoretical performance, but lags somewhat. In the real world, data recovery on radio interfaces are never as perfect as theory assumes. For example, if a receiver misses the frame preamble, it will not attempt to decode the rest of the frame, whereas theory does not account for these types of issues. Despite these issues, theory elucidates the real world. The performance of BPSK 1/2 when the jamming signal is 2.5 times stronger than the data signal was also examined. FIG. 11 shows the results that the real world lags theory.

In summary, it was seen that the experimental data-jam devices were able to use BPSK 1/2 to provide communication in the presence of jamming when the data and jamming signals are of equal strength and the devices were closer than about 5 cm. Data could not be recovered by devices at longer ranges.

6. Security

In Section 5, above, it was seen that the experimental data-jam devices were able to provide communication while devices are in close physical proximity. This section discusses an adversary attempting to eavesdrop the data transfer or inject frames. Here, it is assumed that the adversary has full knowledge of how data-jam works and is able to employ more sophisticated equipment than COTS devices.

6.1 Eavesdropping

An adversary might attempt to eavesdrop on the data transferred between data-jam devices. Assuming the adversary is located more than about 7 cm away, the strength of the data and jamming signal the adversary receives will be roughly equal. An adversary might then attempt to separate the data and jamming signals with a directional antenna or with signal processing and MIMO antennas.

6.1.1 Directional Antennas (Example Antenna Spacing of γ/2)

Figure 12:
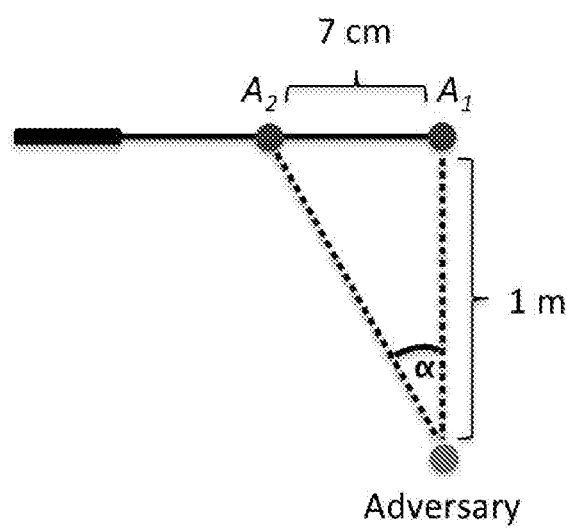
FIG. 12 is a diagram illustrating an adversary attempting to eavesdrop on a data-jam apparatus having a 7 cm antenna spacing using a directional antenna.

A directional antenna with a narrow main lobe pointed precisely at the data antenna, but excluding the jamming antenna, would allow the adversary to receive the data signal only. In one example, data-jam apparatus's antennas, however, are only one-half wavelength apart and because the main lobe expands with distance, the lobe will encompass both antennas if the adversary is located a reasonable distance away or is in-line with the data-jam device's antennas. For example, as shown in FIG. 12, an adversary located 1 m away and bore-sighted on one of the data-jam apparatus's antennas would need to have a one-half beam width of $\alpha = \tan^{-1} (6.25/100) \approx 3.5$ degrees to avoid receiving a signal from the data-jam apparatus's jamming antenna.

A 0.5 m dish antenna operating at WI-FI® frequencies would have a one-half beam width of 8.1 degrees. This beam width is far wider than the width required for an adversary to receive from the data-jam apparatus's data antenna if the adversary is located only 1 m away. If the adversary is located more than 1 m, it would need an even smaller beam width than 3.5 degrees. Furthermore, because at least one of the data-jam devices is typically mobile, the exact orientation and location of devices is difficult to predict a priori.

6.1.2 Signal Processing and MIMO Antennas

Alternatively, an adversary might try sophisticated signal-processing techniques to separate the data from the jamming signal. Researchers have shown that, provided the adversary is located at a distance much greater than the separation between transmit antennas (in this example, antennas $A_1$ and $A_2$), and the two transmit antennas are within one-half wavelength of each other, the channel matrix has Rank 1 and the signals cannot be separated.

Figure 13:
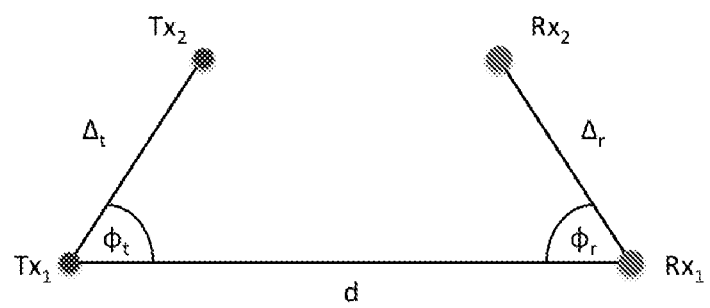
FIG. 13 is a diagram illustrating Channel Rank for a transmitting device having two antennas and a receiving device having two antennas for a data-jam eavesdropping scenario.

As an illustration, in FIG. 13 a transmitter with antennas $T_{x1}$ and $T_{x2}$ are separated by $\Delta_t$ and oriented with angle $\varphi_t$ relative to a receiver with antennas $R_{x1}$ and $R_{x2}$ separated by $\Delta_r$ and oriented with angle $\varphi_r$ relative to the transmitter. $T_{x1}$ and $R_{x1}$ are separated by distance d. If the transmitter has $n_t$ antennas and the receiver has $n_r$ antennas, then the channel between receive antenna r and transmit antenna t can be represented by the following when the receiver is located a distance significantly greater than the spread between transmit antennas:

$$h_{rt} = \alpha \sqrt{n_r n_t} (e^{-j2\pi d/\lambda})(e^{j2\pi(t-1)\Delta_t \cos \varphi_t}) \times (e^{-j2\pi(r-1)\Delta_r \cos \varphi_r})$$ Eq. (16)

wherein α is an attenuation factor, $r=1 \ldots n_r$, and $t=1 \ldots n_t$.

For the 2×2 MIMO arrangement depicted in FIG. 5, the resulting channel using Equation (16) is $$H = \alpha 2 e^{-\frac{j2\pi d}{\lambda}} \times \begin{bmatrix} 1 & e^{-j2\pi \Delta_r \cos \varphi_r} \\ e^{-j2\pi \Delta_t \cos \varphi_t} & e^{-j2\pi \Delta_t \cos \varphi_t} e^{-j2\pi \Delta_t \cos \varphi_t} \end{bmatrix}$$ Eq. (17)

It is seen that the second column is the same as the first column, except that the second column is multiplied by a factor of $e^{-j2\pi \Delta_r \cos \varphi_r}$. This demonstrates the channel matrix H has Rank 1, holds even if the receiver has more than two antennas, and indicates signals cannot be separated by the receiver.

Other researchers, however, exploited the fact that in the equations above a receiver must be located at a significantly greater distance than the transmit antenna spread to ensure the channel matrix has Rank 1. They showed that by using MIMO receive antennas at relatively close range, signals can be separated in some cases. Their analysis evaluated an adversary attempting to separate a 400 MHz data signal sent by one antenna using simple Frequency Shift Keying (FSK) from a jamming signal sent by a second antenna separated by 15 cm or more. They showed that it is theoretically possible to extract a signal with less than a 20% bit error rate at ranges around two meters. In practice, however, they found that (even with precise alignment of the antennas) multipath signals often defeated separation attempts. Furthermore, separating the more complex modulation schemes of the WI-FI® protocol at higher frequencies and smaller antenna spreads is more difficult than separating simple low-frequency FSK signals with large antenna separation. Those researchers did not demonstrate the capability to separate more complex WI-FI® signals from jamming.

6.2 Frame Injection

An adversary may attempt to inject their own frames while data is transferred between data-jam devices. In that case, the adversary's signal would have to exceed the jamming signal strength. Because the jamming signal is located in close proximity to the receiving device, the Inverse-Square Law helps the data-jam system defend against such an attack. In an example, even though a data-jam apparatus transmits at 4 dBm, an adversary located only 2 m away using a 9 dBi omnidirectional antenna would need to roughly double the maximum transmit power limits set by the U.S. Federal Communications Commission to exceed the data-jam apparatus's signal strength.

7. Bidirectional Communications

The above discusses unidirectional communication—data moves from a multiple-antenna device to a target device that has one antenna. Here, bidirectional communication is discussed.

If the target device also has two antennas, bidirectional communication is possible simply by reversing roles. If one device only has one antenna, however, secure bidirectional communications is still possible. In this case, the single-antenna device can alert the multiple-antenna device that it has data to send, and the multiple-antenna device initiates jamming on one antenna while listening on its other antenna. The single-antenna device can then monitor the noise floor. When the noise floor rises above a preset threshold, strong jamming is in place and it then transmits its data. In this way, a single-antenna device can bidirectionally communicate with a multiple-antenna device.

This approach, however, has some limitations. If the adversary is able to raise the noise floor above a threshold, the adversary may be able to trick the single-antenna device. The adversary could time his jamming such that after reaching the threshold on the single-antenna device, the adversary stops jamming just as the single-antenna device transmits. In this case the data is transmitted without jamming coverage and could be intercepted. To counter this attack, however, the single-antenna device could wait a random amount of time after the noise threshold is reached before sending the data. This way if the adversary stopped jamming, the single-antenna device would detect it and not transmit.

As noted in Section 6, above, an adversary would need to transmit a great deal of power to raise the noise floor to a level comparable to a nearby data-jam apparatus. It is possible, however, that a formidable adversary with a highly directional antenna and extremely powerful transmitter may be able to raise the noise floor sufficiently.

8. Example Embodiments

Figure 14:
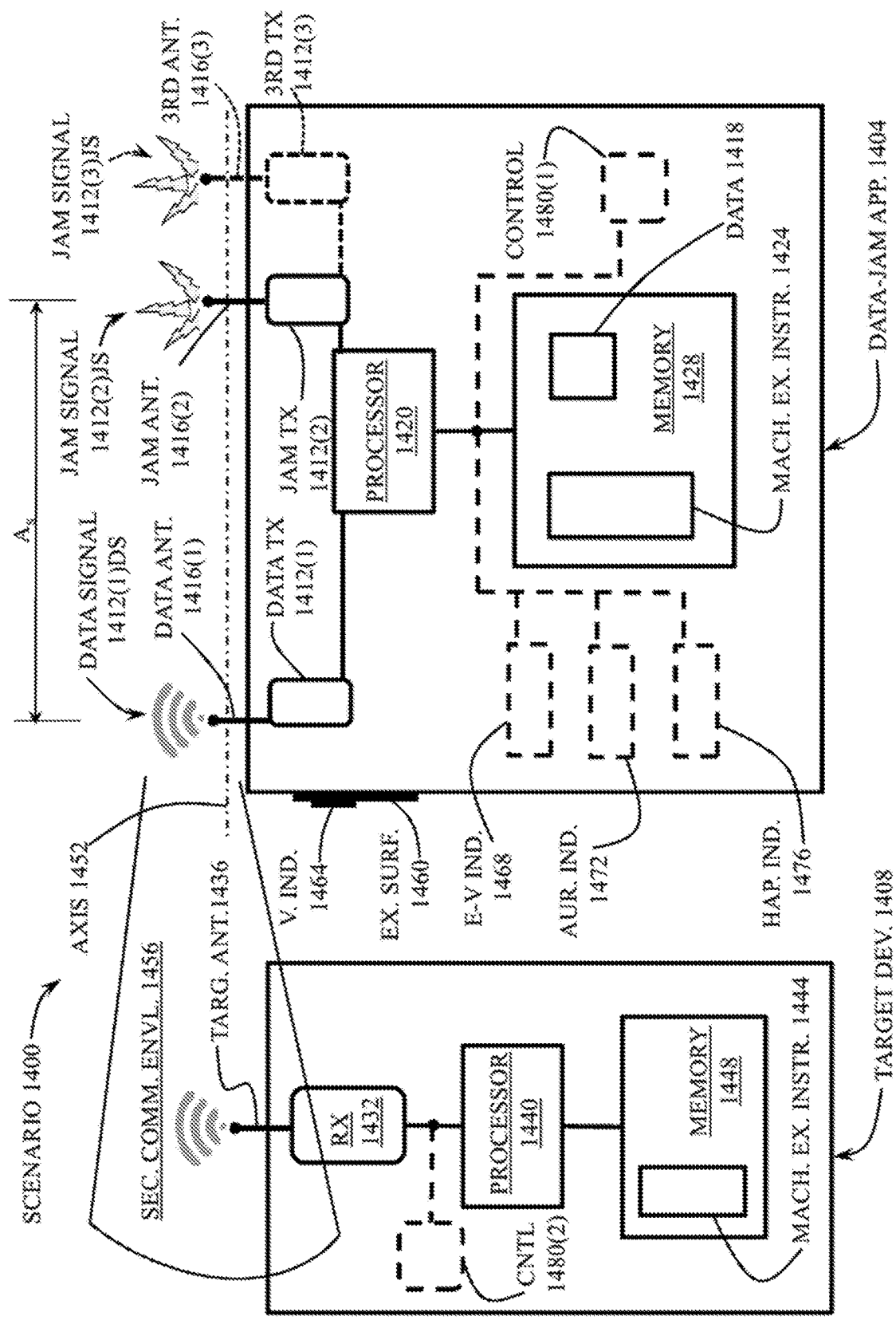
FIG. 14 is a partial high-level block diagram/partial schematic diagram illustrating a scenario involving secure short-range wireless communication between a data-jam apparatus and a target device.

FIG. 14 illustrates a scenario 1400 in which a data-jam apparatus 1404 made in accordance with aspects of the present disclosure is securely communicating with a target device 1408. Data-jam apparatus 1404 may be, for example, embodied in any one of the devices noted above in the Introduction section. Similarly, target device 1408 may be, for example, any one of the devices noted above in the Introduction section for target devices. Generally, there are no limitations on the devices in which data-jam apparatus 1404 may be embodied except for the ability to communicate wirelessly with target device 1408 and the need to have at least a pair each of transmitters and corresponding respective antenna. For simplicity, the present example shows data-jam apparatus 1404 as having two transmitters 1412(1) and 1412(2) and corresponding respective antennas 1416(1) and 1416(2); receivers and receiving antennas are not shown. In this example, transmitter 1412(1) is designated as the "data transmitter", because it transmits a data signal 1412(1)DS that contains data 1418 to be transmitted to target device 1408. Correspondingly, antenna 1416(1) is designated as the "data antenna". Transmitter 1412(2) is designated as the "jamming transmitter", because it transmits a jamming signal 1412(2)JS that contains radio interference to be transmitted to target device 1408. Correspondingly, antenna 1416(2) is designated as the "jamming antenna".

Also in this example, each of data and jamming transmitters 1412(1) and 1412(2) is controlled by one or more processors (collectively illustrated and referred to hereinafter as processor 1420) via any suitable wired or wireless connection. Processor 1420 may be any suitable processor, such as a microprocessor, an application specific integrated circuit, part of a system on a chip, or a field-programmable gate array, among other architectures. Processor 1420 is configured to execute suitable machine-executable instructions 1424 for controlling data and jamming transmitters 1412(1) and 1412(2) and any other functionalities of data-jam apparatus 1404. Machine-executable instructions 1424 are stored in one or more memories (collectively illustrated and referred to hereinafter as memory 1428), which may be any type(s) of suitable machine memory, such as cache, RAM, ROM, PROM, EPROM, and/or EEPROM, among others. Machine memory can also be another type of machine memory, such as a static or removable storage disk, static or removable solid-state memory, and/or any other type of persistent hardware-based memory. Fundamentally, there is no limitation on the type(s) of memory other than it be embodied in hardware. Machine-executable instructions 1424 compose the software (e.g., firmware) of data-jam apparatus 1404.

Each of data and jamming transmitters 1412(1) and 1412(2) is operatively configured to transmit wireless signals using any suitable communications protocol, such as any one of the WI-FI®, BLUETOOTH®, and ZIGBEE® protocols, among others, that may, for example, operate under any suitable standard, such as any IEEE 802.11 or IEEE 802.15 standard, among others. Such transmitters (e.g., radios) are well-known in the art; consequently, transmitters 1412(1) and 1412(2) can be, if desired, embodied in COTS radios. Correspondingly, target device 1408 includes at least one receiver 1432 having a "target" antenna 1436. Receiver 1432 is operatively configured to receive wireless signals using the same communications protocol that data and jamming transmitters 1412(1) and 1412(2), respectively, use.

Target device 1408 also includes one or more processors (collectively illustrated and referred to hereinafter as processor 1440) that executes machine-executable instructions 1444 for recovering data transmitted by data-jam apparatus 1404 and received by receiver 1432. Machine-executable instructions 1444 are stored in one or more memories (collectively illustrated and referred to hereinafter as memory 1448), which may be any suitable type(s) of memory, such as cache, RAM, ROM, PROM, EPROM, and/or EEPROM, among others. Fundamentally, there is no limitation on the type(s) of memory other than it be embodied in hardware. Machine-executable instructions 1444 compose the software (e.g., firmware) of target device 1408.

As described above, a fundamental operating principle of a data-jam apparatus of the present disclosure, such as data-jam apparatus 1404 of FIG. 14, is that data and jamming antennas 1416(1) and 1416(2) should be spaced from one another by a fixed spacing, $A_s$, that will allow target antenna 1436 to receive signals of meaningfully different powers from the two antennas of the data-jam apparatus. Setting fixed spacing $A_s$ to about one-half the wavelength ($\lambda/2$) of the frequency band at which data-jam apparatus 1404 transmits can be a good choice for a number of reasons, including the fact that this spacing can make it difficult for eavesdroppers using directional antennas to recover data from the data signal, here, 1412(1)DS, in the presence of noise from the jamming signal, here 1412(2)JS. However, other spacings both larger than or smaller than $\lambda/2$ can be used, as desired, as long as the spacing provides a sufficient differential in power between data signal 1412(1)DS and jamming signal 1412(2)JS.

As also described above, a fundamental operating principle of a data-jam scenario of the present disclosure, such as scenario 1400 of FIG. 14, is that a target antenna of a target device, here, target antenna 1436 of target device 1408, is located proximate to the data antenna and distal from the jamming antenna, here, data antenna 1416(1) and jamming antenna 1416(2), respectively. Consequently, target antenna 1436 and data antenna 1416(1) must be at or within a communications distance, $D_c$, that is equal to or less than a maximum secure-communications distance, $D_{cmax}$, and the antenna spacing axis 1452, along which data and jamming antennas 1416(1) and 1416(2) are spaced, must be oriented properly relative to the target antenna so that the communications distance $D_c$ is within the maximum secure-communications distance $D_{cmax}$. The orientation of antenna spacing axis 1452 and the maximum secure-communications distance $D_{cmax}$ may be combined to define a secure-communications envelope 1456. Once target antenna 1436 is within secure-communications envelope 1456, secure communication of data can occur between data-jam apparatus 1404 and target device 1408.

When data antenna 1416(1) is spaced from jamming antenna 1416(2) by about $\lambda/2$ of the frequency band that data and jamming transmitters 1412(1) and 1412(2) transmit on, maximum communications distance $D_{cmax}$ is dependent on that frequency. In some embodiments for any of the aspects described herein, the frequency utilized is from about 0.9 to 6.0 GHz (i.e., one wavelength is about 33 cm to about 5 cm and $\lambda/2$ is about 16.5 cm to about 2.5 cm). For example, the frequency may be about 2.4 GHz (i.e., one wavelength is about 12.5 cm and $\lambda/2$ is about 6.25 cm). As another example, the frequency may be about 3.6 GHz (i.e., one wavelength is about 8.3 cm and $\lambda/2$ is about 4.15 cm). As still another example, the frequency may be about 5.0 GHz (i.e., one wavelength is about 6.0 cm and λ/2 is about 3 cm).

Consequently, in some embodiments, λ/2, and the spacing of data antenna 1416(1) and jamming antenna 1416(2) may be from about 2 cm to about 20 cm, from about 3 cm to about 10 cm, such as about 3 cm, about 4 cm, about 5 cm, about 6 cm, about 7 cm, about 8 cm, about 9 cm, or about 10 cm. In some embodiments, λ/2 may be from about 2.8 cm to about 3.2 cm. In some embodiments, λ/2 may be about 3.0 cm. In some embodiments, λ/2 may be from about 4.0 cm to about 4.5 cm. In some embodiments, λ/2 may be about 4.2 cm. In some embodiments, λ/2 may be from about 6.0 cm to about 6.5 cm. In some such embodiments, λ/2 may be about 6.25 cm.

Correspondingly, in some embodiments, maximum secure-communications distance $D_{cmax}$ between data antenna 1416(1) and target antenna 1436 along antenna spacing axis 1452 is from about 1 cm to about 10 cm. In some embodiments, maximum secure-communications distance $D_{cmax}$ between data antenna 1416(1) and target antenna 1436 along antenna spacing axis 1452 is about 1 cm, about 2 cm, about 3 cm, about 4 cm, or about 5 cm. It is noted that these values of maximum secure-communications distance $D_{cmax}$ diminish as target antenna 1436 deviates from being along antenna spacing axis 1452.

In some embodiments, a data-jam apparatus of the present disclosure, such as data-jam apparatus 1404 of FIG. 14, can include an indication of proper orientation of the antenna spacing axis, here, antenna spacing axis 1452, relative to a target device, such as target device 1408 to alert a user where the target device needs to be so that its target antenna is properly located relative to the data and jamming antennas of the data-jam apparatus. For example, an exterior surface 1460 of data-jam apparatus 1404 may optionally include a visual indicator 1464 that indicates to the user where to place target device 1408 relative to the data-jam apparatus.

In some embodiments, data-jam apparatus may include functionality for determining the distance target device 1408 (target antenna 1436) is from data antenna 1416(1). For example, data-jam apparatus may include a received signal strength indicators (RSSIs) associated with data and jamming antennas 1416(1) and 1416(2) can be used to determine the location of target antenna 1436 relative to the data antenna. However, other technologies can be used to determine the distance.

Correspondingly, data-jam apparatus 1404 may optionally be provided with one or more electronic visual indicators 1468 (e.g., LEDs, electronic display, lighted arrows, etc.), one or more aural indicators 1472 (e.g., speaker, beeper, buzzer, etc.), and/or one haptic indicator (e.g., vibrator, etc.) to indicate whether or not target antenna 1436 is within secure-communications envelope 1456. Depending on the sophistication of electronic visual indicator 1468, it may guide a user to move, as needed for the particular situation, one or the other or both of data-jam apparatus 1404 and target device 1408 so that target antenna 1436 is within secure-communications envelope 1456. For example, if electronic visual indicator 1468 is a display screen, machine-executable instructions 1424 may include machine-executable instructions for displaying a realtime graphical depiction of data-jam apparatus 1404 and target device 1408 and the locations and/or orientation relative to one another. Such a display screen may also or alternatively give verbal instructions guiding the user to properly locate and/or orient data-jam apparatus 1404 and target device 1408 relative to one another. If aural indicator 1472 is provided, it may be made sophisticated enough to provide oral instructions to a user on how to properly locate and/or orient data-jam apparatus 1404 and target device 1408 relative to one another. It is noted that a target device, such as target device 1408, can also or alternatively be provided with the same or similar means for determining when target antenna 1436 is properly within secure-communications envelope 1456 and/or for guiding a user to cause the target antenna to be properly within the secure-communications envelope.

In some embodiments, data-jam apparatus 1404 can be configured to initiate data-jam operations, including the simultaneous transmission of data signal 1412(1)DS and jamming signal 1412(2)JS, based on target antenna 1436 being within secure-communications envelope 1456. Such initiation can be performed either partially or fully automatically. Regarding partial automation, data-jam operations may be initiated by a user selecting a soft or hard control on either data-jam apparatus 1404 (e.g., control 1480(1)) or target device 1408 (e.g., control 1480(2)) that sends an initiate-data-jam signal or instruction to processor 1420, which the processor then receives and processes to initiate the data-jam operations. A user would be instructed (e.g., a priori) to select the control when they are aware that target antenna 1436 is within secure-communications envelope 1456 and orientation of antenna spacing axis 1452 is proper. Regarding full automation, data-jam operations may be initiated by either data-jam apparatus 1404 or target device 1408 automatically determining when target antenna 1436 is within secure-communications envelope 1456 and/or orientation of antenna spacing axis 1452 is proper. In this case, processor 1420 effectively receives an initiate-data-jam instruction when the processor has determined that target antenna 1436 is within secure-communications envelope 1456 and/or orientation of antenna spacing axis 1452 is proper.

In response to processor 1420 receiving a data-jam-initiation instruction or signal, the processor executes machine-executable instructions contained in machine-executable instructions 1424 that cause data transmitter 1412(1) to transmit data signal 1412(2)DS containing data 1418, for example, from memory 1428 and/or from a data source (not shown) off board of data-jam apparatus 1404. As discussed above in the Introduction section, data 1418 may be any sort of data, from data collected by data-jam apparatus 1404, information for setting up a secure communications between the data-jam apparatus and target device and/or another device (not shown). Fundamentally, there is no limitation on data 1418 transmitted. Also in response to processor 1420 receiving a data-jam-initiation instruction or signal, the processor executes machine-executable instructions contained in machine-executable instructions 1424 that cause jamming transmitter 1412(2) to transmit jamming signal 1412(2)JS simultaneously with data transmitter 1412(1) transmitting data signal 1412(1)DS.

As discussed above in the Introduction section, jamming signal 1412(1)JS may be any suitable type of jamming signal, such as a barrage-type jamming signal or a tone-type jamming signal. As also noted above, jamming transmitter 1412(2) may transmit jamming signal 1412(2)JS continuously or intermittently while data transmitter 1412(1) is transmitting data signal 1412(1)DS. Jamming transmitter 1412(2) may transmit jamming signal 1412(2)JS at the same power as data transmitter 1412(1) transmits data signal 1412(1)DS. In other embodiments, jamming transmitter 1412(2) may transmit jamming signal 1412(2)JS at a power higher or lower than the power at which data transmitter 1412(1) transmits data signal 1412(1)DS. However, one or both of data recoverability by target device 1408 and protection from eavesdropping may be compromised using differing powers as between data-jam apparatus 1404 and the target device.

It is recognized that increasing operating frequencies of radios for local-area network communications may continue to increase and that, as the frequencies increase, spacings between multiple antennas will decrease if approximately $\lambda/2$ wavelength spacing is maintained. Decreasing antenna spacing leads to a decreased secure communications envelope 1456, and at some point it may become impractical or impossible, depending on where the relevant antennas are located with the various devices, to physically place the devices close enough to one another. As a solution and in the context of FIG. 14, data-jam apparatus 1404 may include a third antenna 1416(3) spaced farther from data antenna 1416(1) than jamming antenna 1416(2) is spaced from the data antenna. During normal higher-frequency operation, data-jam apparatus 1404 may use the more closely spaced antennas 1416(1) and 1416(2). However, when alerted to the close proximity of target device 1408, machine-executable instructions 1424 may control processor 1420 to activate a third transmitter 1412(3) to provide a jamming signal 1412(3)JS when data transmitter 1412(1) is transmitting data signal 1412(1)DS. In addition, machine-executable instructions may also lower the frequency of transmission of data and third transmitters 1412(1) and 1412(3), respectively, to a lower frequency, such as a frequency having a wavelength that is twice the distance between data and third antennas 1416(1) and 1416(3). The larger spacing between data antenna 1416(1) and third antenna 1416(3) allows for a larger maximum communications distance $D_{cmax}$ that can be practically achieved.

Figure 15:
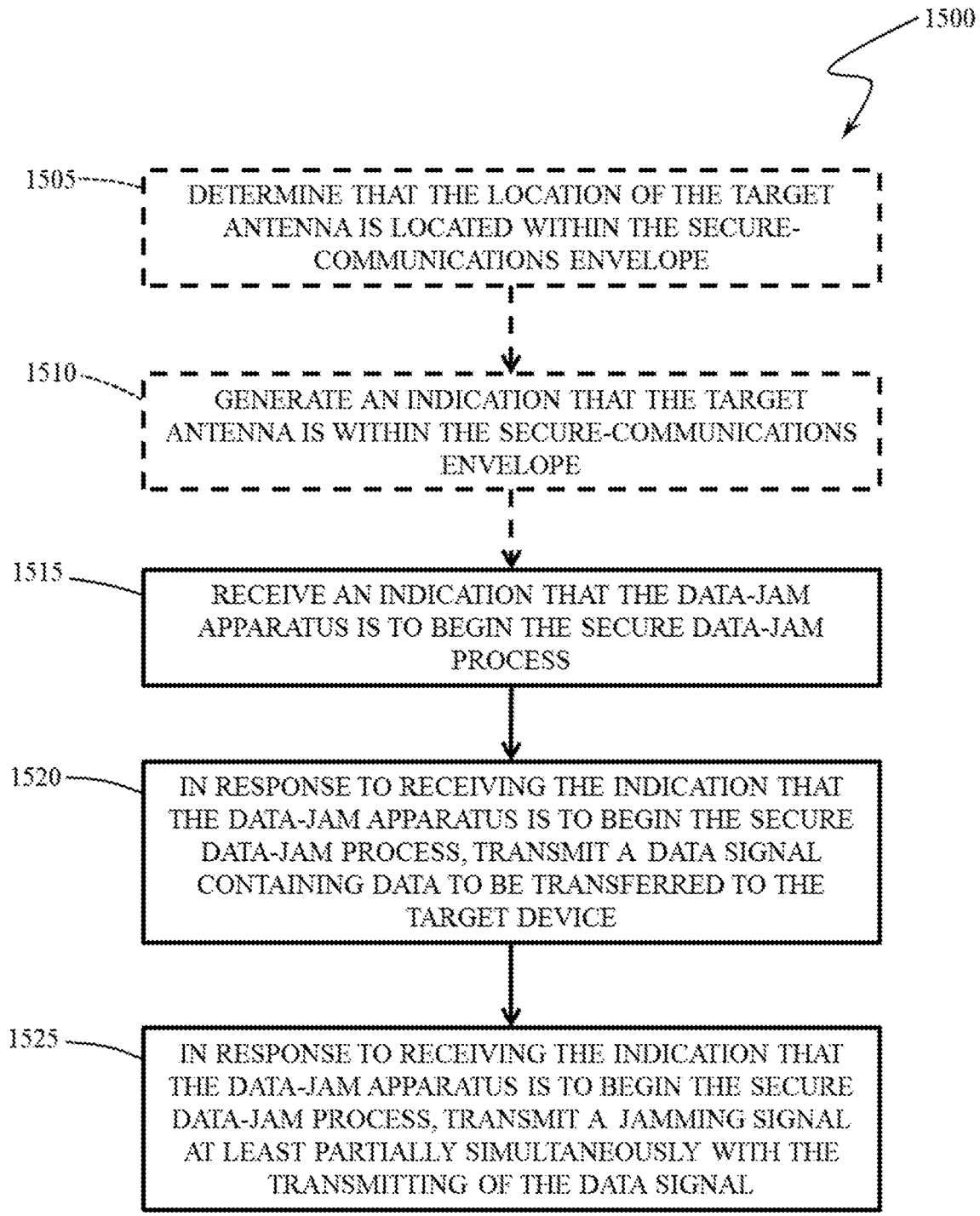
FIG. 15 is a flow diagram illustrating an example method of wirelessly transmitting data to a target device in accordance with aspects of the present disclosure.

FIG. 15 illustrates an example method 1500 of wirelessly transmitting data, such as data 1418, to a target device, such as target device 1408 of FIG. 14. Method 1500 may be performed by a suitable data-jam apparatus of the present disclosure, such as data-jam apparatus 1404 of FIG. 14. For convenience, method 1500 is described in conjunction with scenario 1400 of FIG. 14. However, method 1500 can be performed in other scenarios and by a data-jam apparatus other than data-jam apparatus 1404 and/or a target device other than target device 1408.

Referring now to FIG. 15, and also to FIG. 14 for referencing 1400-series element identifiers, method 1500 may begin at optional block 1505 by determining that the location of target antenna 1436 of target device 1408 is within secure-communications envelope 1456. As described above in connection with scenario 1400 of FIG. 14, such determining may be performed automatically using RSSI levels measured by one or the other of data-jam apparatus 1404 and target device 1408 or other suitable method and utilizing suitable machine-executable instructions. Optional block 1505 may also be performed manually by a user visually or otherwise determining that target antenna 1436 (or target device 1408, more generally) is within secure-communications envelope 1456. Correspondingly, at optional block 1510, an indication that target antenna 1436 is within secure-communications envelope 1456 may be generated. In a fully automated embodiment, either data-jam apparatus 1404 or target device 1408 may automatically generate such indication based on automatically determining that target antenna 1436 is within secure-communications envelope 1456. In a partially automated embodiment, a user can select hard or soft control 1480(1) or 1480(2) on one or the other of data-jam apparatus 1404 and target device 1408 when the user has determined that target antenna 1436 is within secure-communications envelope 1456. In response, either data-jam apparatus 1404 or target device 1408 may generate a within-envelope indication.

It is noted that data-jam apparatus 1404 need not be responsive to an indication that target antenna 1436 is within secure-communications envelope 1457. Rather, data-jam apparatus 1404 may be responsive to an indication generated in another manner. For example, data-jam apparatus 1404 may include machine-executable instructions, for example, as part of machine-executable instructions 1424, that cause jamming transmitter 1412(2) to transmit jamming signal 1412(2)JS intermittently, regardless of the data-jam apparatus being aware of the presence of a target device. Such intermittent transmission of jamming signal 1412(2)JS may be, for example, periodic, random, or otherwise intermittent. In this example, the indication may be embodied in machine-executable instructions that causes processor 1420 to start the secure data-jam communications process, including causing jamming transmitter 1412(2) to transmit jamming signal 1412(2)JS. As another example, an indication to start the secure data-jam communications process may be based on a sensor, such as an environmental sensor (e.g., temperature, light, sound, etc.) or other device being triggered, such that the secure data-jam communications process should be performed.

In each of the immediately preceding scenarios, it is recognized that a target device (antenna), such as target device 1408 (antenna 1436) may not be present within secure-communications envelope 1456. In such a case, data-jam apparatus 1404 may include machine-executable instructions, for example, as part of machine-executable instructions 1424, that send a notification to the target device that the target device needs to be moved closer to data antenna 1416(1) of the data-jam apparatus.

At block 1515, an indication, such as the indication from optional block 1510 or from another source, indicating that data-jam apparatus 1404 is to begin the secure data-jam communications process is received. At block 1520, in response to receiving an indication that data-jam apparatus 1404 is to begin the secure data-jam communications process, data transmitter 1412(1) transmits data signal 1412(1)DS containing data 1418. Correspondingly, at block 1525, in response to receiving the indication that data-jam apparatus 1404 is to begin the secure data-jam communications process, jamming transmitter 1412(2) transmits jamming signal 1412(2)JS at least partially simultaneously with data transmitter 1412(1) transmitting data signal 1412(1)DS so as to provide the jamming needed to keep remote wireless devices from recovering data 1418 from data signal 1412(1)DS. It is noted that the transmission of jamming signal 1412(2)JS need not start simultaneously with the transmission of data signal 1412(1)DS. For example, data-jam apparatus 1404 may begin transmitting jamming signal 1412(2)JS before starting to transmit data signal 1412(1)DS. Processor 1420 may control the operation of data and jamming transmitters 1412(1) and 1412(2) so that they perform their requisite functionalities in effecting the secure data-jam communications of the present disclosure. As will be understood by those skilled in the art, various blocks of method 1500 may be executed by suitable machine-executable instructions, which may be part of machine-executable instructions 1424 stored in memory 1428 of data-jam apparatus 1404, while some or all of optional blocks 1505 and 1510 may be executed by suitable machine-executable instructions that are part of machine-executable instructions 1444 stored in memory 1448 of target device 1408.

Figure 16:
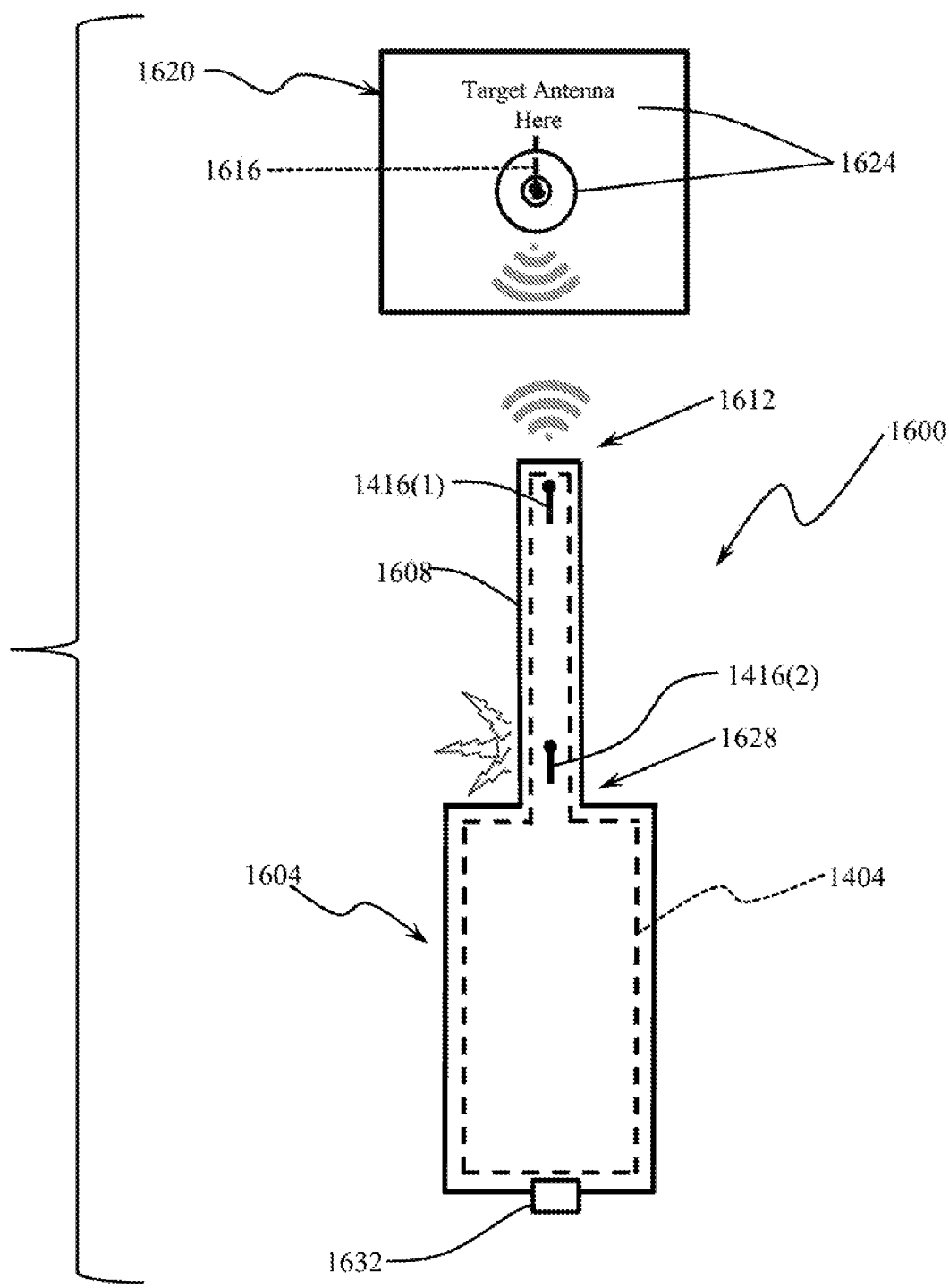
FIG. 16 is a high-level diagram illustrating an example handheld data-jam device in close proximity to a target device.

As noted above in the Introduction section, there are many scenarios in which both a data-jam apparatus and a target device are practically immovable so that they can be brought into close enough proximity to effect secure data-jam communications. In such scenarios, embodying a data-jam apparatus of the present disclosure in a mobile device such as a handheld wand can provide the mobility needed. FIG. 16 illustrates an example handheld data-jam wand 1600 that embodies data-jam apparatus 1404 of FIG. 14. In this example, data-jam wand 1600 includes a gripping region 1604 and a data-antenna extension 1608 having a target end 1612 distal from the gripping region. Gripping region 1604 may be any suitable size that allows a human hand to hold data-jam wand 1600. For example, gripping region 1604 may be large enough for gripping by an entire hand or only large enough to accommodate gripping between one finger and a thumb. Data-antenna region 1608 contains data antenna 1416(1), preferably, but not necessarily, such that the data antenna is as close to target end 1612 of data-jam wand 1600 that a user places in close-enough proximity as target antenna 1616 of a target device 1620 to effect secure data-jam communications. In this example, target antenna 1616 is located inside of target device 1620, and the target device has indicia 1624 indicating where the user is to place target end 1612 of data-jam wand 1600 to effect secure data-jam communications.

Jamming antenna 1416(2) of data-jam apparatus 1404 may be located at any suitable location within data-jam wand 1600 to provide the requisite antenna spacing. Depending on the requisite spacing and the design of data-jam wand 1600, jamming antenna 1416(2) may be located at a base-end 1628 of data-antenna extension 1608 or within grip region 1604. Depending on the physical size of data-jam wand 1600, data-antenna extension 1608 may be eliminated, for example, by locating data antenna 1416(1) at one end of gripping region 1604 and jamming antenna 1416(2) at the opposing end of the gripping region.

Data-jam wand 1600 may include any or all of the functionalities of data-jam apparatus 1404 as described above in conjunction with FIG. 14 and/or any other functionalities described in previous sections. In addition, data-jam wand 1600 may optionally include a port 1632 for creating a secure wired connection between the data-jam wand and a third device (not shown), such as a wireless router or computer, among many others. Port 1632 can be for any suitable data-communications connector (not shown), such as an Ethernet connector, a USB connector, a FireWire connector, among many others. Using port 1632 and corresponding connector and connecting the connector to the third device, data-jam wand 1600 can function as a go-between device for securely delivering data from the third device to target device 1620. Such data can be any sort of data, including information that allows target device 1620 and the third device to establish a long-range secure wireless communications link. Those skilled in the art will readily appreciate that data-jam wand 1600 can be embodied in many forms other than the form illustrated in FIG. 16.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for wirelessly transmitting data to a target device having a target antenna located at a location, the apparatus comprising:
 a first antenna;
 a second antenna positioned a first fixed spacing from the first antenna;
 a first transmitter in operative communication with the first antenna;
 a second transmitter in operative communication with the second antenna;
 at least one processor in operative communication with each of the first transmitter and the second transmitter; and
 a memory containing machine-executable instructions for controlling each of the first and second transmitters, wherein the machine-executable instructions include instructions for controlling the at least one processor so as to:
  cause the first transmitter to transmit via the first antenna a data signal containing the data; and
  cause the second transmitter to transmit via the second antenna a jamming signal while the first transmitter is transmitting the data signal, without regard to directionality of the jamming signal relative to the location of the target antenna.

2. The apparatus according to claim 1, wherein each of the first and second transmitters transmit a signal at a wavelength, $\lambda$, and the first fixed spacing is about $\lambda/2$.

3. The apparatus according to claim 1, wherein each of the first and second transmitters transmit a signal at a wavelength, $\lambda$, and the first fixed spacing is greater than $\lambda/2$.

4. The apparatus according to claim 1, wherein each of the first and second transmitters transmit a signal at a wavelength, $\lambda$, and the first fixed spacing is less than $\lambda/2$.

5. The apparatus according to claim 1, wherein the first transmitter transmits the data signal at a first power and the second transmitter transmits the jamming signal at a second power equal to the first power.

6. The apparatus according to claim 1, wherein the first transmitter transmits the data signal at a first power and the second transmitter transmits the jamming signal at a second power higher than the first power.

7. The apparatus according to claim 6, wherein the second power is up to 2.5 times higher than the first power.

8. The apparatus according to claim 1, wherein the first transmitter transmits the data signal at a first power and the second transmitter transmits the jamming signal at a second power lower than the first power.

9. The apparatus according to claim 1, wherein the first transmitter transmits the data signal during a time period, and the machine-executable instructions are configured to cause the second transmitter to transmit the jamming signal continuously during that time period.

10. The apparatus according to claim 1, wherein the first transmitter transmits the data signal during a time period, and the machine-executable instructions are configured to cause the second transmitter to transmit the jamming signal intermittently during the time period.

11. The apparatus according to claim 1, wherein the first transmitter transmits the data signal during a time period, and the machine-executable instructions are configured to cause the second transmitter to begin transmitting the jamming signal prior to the time period.

12. The apparatus according to claim 1, wherein:
the target device includes at least one target antenna and transmits a target signal;
the apparatus further comprising a notification system; and
the machine-executable instructions are configured to:
determine when the target antenna is within a predetermined communications distance from the first antenna based on the apparatus receiving the target signal; and
when the target antenna is within the predetermined communications distance, notify a user via the notification system that the target antenna is within the predetermined communications distance.

13. The apparatus according to claim 12, wherein the machine-executable instructions are further configured to begin transmitting the data based on the target antenna being within the predetermined communications distance.

14. The apparatus according to claim 1, wherein:
the target device includes at least one target antenna and transmits a target signal;
the apparatus further comprising a notification system; and
the machine-executable instructions are configured to:
determine a location of the target antenna relative to the first antenna based on the apparatus receiving the target signal; and
notify a user via the notification system that the location is within a predetermined communications envelope.

15. The apparatus according to claim 14, wherein the machine-executable instructions are further configured to guide the user on how to move at least one of the apparatus and the target device so that the target device is within the predetermined communications envelope.

16. The apparatus according to claim 14, wherein the machine-executable instructions are further configured to begin transmitting the data based on the location of the target antenna being within the predetermined communications envelope.

17. The apparatus according to claim 1, wherein:
the target device includes at least one target antenna and transmits a target signal;
the apparatus has an antenna axis extending through each of the first and second antennas, the apparatus further comprising a notification system; and
the machine-executable instructions are configured to:
determine an orientation of the antenna axis relative to the first antenna based on the apparatus receiving the target signal; and
notify a user via the notification system that the orientation of the antenna axis is within a predetermined envelope of communications orientations.

18. The apparatus according to claim 17, wherein the machine-executable instructions are further configured to guide the user on how to move the apparatus so that orientation of the antenna axis is within the predetermined envelope of communications orientations.

19. The apparatus according to claim 17, wherein the machine-executable instructions are further configured to begin transmitting the data based on the orientation of the antenna axis being within the predetermined envelope of communications orientations.

20. The apparatus according to claim 17, wherein the machine-executable instructions are further configured to:
when each of the first receiver and the second receiver are receiving the target signal, determine when the target antenna is within a predetermined communications distance from the first antenna; and
when the target antenna is within the predetermined communications distance, notify a user via the notification system that the target antenna is within the predetermined communications distance.

21. The apparatus according to claim 20, wherein the machine-executable instructions are further configured to begin transmitting the data based on the target antenna being within the predetermined communications distance and based on the orientation of the antenna axis being within the predetermined envelope of communications orientations.

22. The apparatus according to claim 1, further comprising:
a third antenna positioned a second fixed spacing from the first antenna, wherein the second fixed spacing is greater than the first fixed spacing;
a third transmitter in operative communication with the third antenna;
a first receiver in operative communication with the first antenna;
a second receiver in operative communication with the second antenna; and
wherein:
the target device transmits a target signal;
the first and second transmitter transmit at a first frequency using, respectively, the first and second antennas; and
the machine-executable instructions are configured to:
determine whether or not the target device is within the communications envelope of the apparatus based on the target signal as received by each of the first and second receivers; and
if the target device is within communications envelope, cause each of the first and third transmitters to transmit at a second frequency lower than the first frequency of, respectively, the data signal and the jamming signal.

23. The apparatus of claim 1, wherein the machine-executable instructions further include instructions for controlling the at least one processor so as to initiate transmitting of the jamming signal based on an indication that the first antenna is located closer to the target antenna than the second antenna.

24. A method of wirelessly transmitting data to a target device having a target antenna, the method comprising:
  receiving an indication to begin a secure-communications process;
  in response to receiving the indication to begin the secure-communications process:
    transmitting a data signal containing the data via a first antenna proximate to the target antenna; and
    simultaneously with the transmitting of the data to the target device, transmitting a jamming signal via a second antenna distal from the target antenna;
  wherein the indication is based on the first antenna being located closer to the target antenna than the second antenna.

25. A memory containing machine-executable instructions for performing a method of wirelessly transmitting data to a target device having a target antenna, the method comprising:
  receiving an indication to begin a secure-communications process;
  in response to receiving the indication to begin the secure-communications process:
    transmitting a data signal containing the data via a first antenna proximate to the target antenna; and
    simultaneously with the transmitting of the data to the target device, transmitting a jamming signal via a second antenna distal from the target antenna;
  wherein the indication is based on the first antenna being located closer to the target antenna than the second antenna.

* * * * *